(12) United States Patent
Locke

(10) Patent No.: US 12,528,723 B2
(45) Date of Patent: Jan. 20, 2026

(54) PLASMA ACTIVATED WATER PRODUCTION WITH MEMBRANE CONCENTRATION

(71) Applicant: Florida State University Research Foundation, Inc., Tallahassee, FL (US)

(72) Inventor: Bruce R. Locke, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 0 days.

(21) Appl. No.: 19/087,002

(22) Filed: Mar. 21, 2025

(65) Prior Publication Data

US 2025/0214872 A1 Jul. 3, 2025

Related U.S. Application Data

(62) Division of application No. 17/711,798, filed on Apr. 1, 2022, now Pat. No. 12,291,470.

(Continued)

(51) Int. Cl.
*C02F 1/44* (2023.01)
*B01D 69/12* (2006.01)
(Continued)

(52) U.S. Cl.
CPC .............. *C02F 1/442* (2013.01); *B01D 69/12* (2013.01); *B01D 71/0211* (2022.08);
(Continued)

(58) Field of Classification Search
None
See application file for complete search history.

(56) References Cited

U.S. PATENT DOCUMENTS 1,708,126 A 4/1929 Esmarch
2,045,343 A 6/1936 Darrah
(Continued)

FOREIGN PATENT DOCUMENTS

CA 1069857 A 1/1980
GB 787748 A 12/1957
(Continued)

OTHER PUBLICATIONS

A. Santafé-Moros, et al., Performance of commercial nanofiltration membranes in the removal of nitrate ions, Desalination, vol. 185, Issues 1-3, 2005, pp. 281-287 (Year: 2005).*

(Continued)

*Primary Examiner* — Magali P Slawski
*Assistant Examiner* — Eric J Mccullough
(74) *Attorney, Agent, or Firm* — FOX ROTHSCHILD LLP

(57) ABSTRACT

A plasma activated water production system includes a plasma reactor and a membrane concentrator. The plasma reactor includes an internal cavity, at least one electrically-conductive inlet capillary and outlet capillary. A mixing chamber has a feed gas inlet, a liquid inlet, and a mixed gas and liquid outlet. A power source is provided. The plasma reactor propagates a plasma discharge between the inlet capillary and the outlet capillary. A membrane concentrator includes a water flow channel with a water inlet and a water outlet, a dry gas inlet and a humidified gas outlet. An ion selective membrane is provided, and water will pass through the membrane into the dry gas, and the water leaving the membrane concentrator will have increased concentrations of nitrates, nitrites and hydrogen peroxide. An electrodialysis embodiment and a method of generating plasma activated with increased concentration of nitrates, nitrites and hydrogen peroxide are also disclosed.

13 Claims, 10 Drawing Sheets

Related U.S. Application Data

(60) Provisional application No. 63/170,836, filed on Apr. 5, 2021.

(51) Int. Cl.
  *B01D 71/02*   (2006.01)
  *B01D 71/30*   (2006.01)
  *C02F 1/469*   (2023.01)
  *C02F 101/16*  (2006.01)

(52) U.S. Cl.
  CPC ......... *B01D 71/0212* (2022.08); *B01D 71/30* (2013.01); *C02F 1/441* (2013.01); *C02F 1/4693* (2013.01); *C02F 2101/163* (2013.01)

(56) References Cited

U.S. PATENT DOCUMENTS

| | | | |
|---|---|---|---|
| 3,205,162 | A | 9/1965 | Maclean |
| 3,497,436 | A | 2/1970 | Yates et al. |
| 4,141,715 | A | 2/1979 | Wyse et al. |
| 4,297,123 | A | 10/1981 | Wyse et al. |
| 4,456,512 | A | 6/1984 | Bieler et al. |
| 4,926,001 | A | 5/1990 | Alagy et al. |
| 5,194,200 | A * | 3/1993 | Anderson .......... B01D 67/0048 428/307.3 |
| 6,228,266 | B1 | 5/2001 | Shim |
| 6,909,505 | B2 | 6/2005 | Lucas et al. |
| 6,923,890 | B2 | 8/2005 | Ricatto et al. |
| 7,122,166 | B2 * | 10/2006 | Parrish .................. C01B 15/013 210/640 |
| 7,378,062 | B2 | 5/2008 | Itatani |
| 7,604,719 | B2 | 10/2009 | Vanden Bussche et al. |
| 7,919,053 | B2 | 4/2011 | Burlica et al. |
| 8,444,924 | B2 | 5/2013 | Burlica et al. |
| 9,861,950 | B2 | 1/2018 | Locke et al. |
| 10,350,572 | B2 | 7/2019 | Locke et al. |
| 10,556,817 | B2 | 2/2020 | Locke et al. |
| 10,589,252 | B2 | 3/2020 | Locke et al. |
| 2004/0116752 | A1 | 6/2004 | Giapis et al. |
| 2006/0060464 | A1 | 3/2006 | Chang |
| 2007/0167638 | A1 | 7/2007 | Brophy et al. |
| 2008/0286169 | A1 | 11/2008 | Meillot |
| 2009/0004074 | A1 | 1/2009 | Tonkovich et al. |
| 2009/0297406 | A1 | 12/2009 | Okino et al. |
| 2010/0220182 | A1 | 9/2010 | Krull |
| 2011/0026657 | A1 | 2/2011 | Laberge et al. |
| 2012/0000787 | A1 | 1/2012 | Santilli |
| 2017/0174537 | A1 * | 6/2017 | Zheng .................... B01D 69/12 |
| 2018/0215639 | A1 * | 8/2018 | Locke .................... H05H 1/486 |
| 2019/0099733 | A1 * | 4/2019 | Locke .................... B01J 19/088 |
| 2021/0331135 | A1 | 10/2021 | Mcenaney et al. |
| 2021/0360847 | A1 | 11/2021 | Mcenaney et al. |

FOREIGN PATENT DOCUMENTS

| | | | |
|---|---|---|---|
| GB | 896113 | A | 5/1962 |
| GB | 966406 | A | 8/1964 |
| JP | 2014039908 | A * | 3/2014 |
| WO | 2012126095 | A1 | 9/2012 |
| WO | 2013052548 | A2 | 4/2013 |
| WO | 2016096751 | A1 | 6/2016 |

OTHER PUBLICATIONS

Katri Häyrynen, et al., Concentration of ammonium and nitrate from mine water by reverse osmosis and nanofiltration, Desalination, vol. 240, Issues 1-3, 2009, pp. 280-289 (Year: 2009).*

Santafe-Moros et al.: "Performance of commercial nanofiltration membranes in the removal of nitrate ions", Desalination 2005, 185 (1-3), 281-287.

Guo et al.: "Nanofiltration for drinking water treatment: a review", Frontiers of Chemical Science and Engineering. 16 (5): 681-698.

International Search Report dated Jun. 9, 2015 in International Application No. PCT/US2015/020475.

Niozaki et al., "Micro-plasma technology—direct methane to-methanol in extremely confined environment", Natural Gas Conversion VII (2004) 147: 505-510.

Agiral et al., "Gas-to-liquids process using multi-phase flow, non-thermal plasma microreactor", Chemical Engineering Journal (2011) 167: 560-566.

Akiyama, "Streamer discharges in liquids and their applications", IEEE Transactions on Dielectrics and Electrical Insulation (2000) 7: 646-653.

Bie et al., "Dielectric barriers discharges used for the conversion of greenhouse gases: Modeling the plasma chemistry by fluid simulations", Plasma Sources Science & Technology (2011) 20(2): 024008. (12 pages).

Bie et al., "Fluid modeling of the conversion of methane into higher hydrocarbons in an atmospheric pressure dielectric barrier discharge", Plasma Processes and Polymers (2011) 8: 1033-1058.

Bruggeman et al., "Non-thermal plasmas in and in contact with liquids", Journal of Physics D: Applied Physics (2009) 42: 1-28.

Burlica et al., "Formation of H2 and H2O2 in water-spray gliding arc nonthermal plasma reactor", Industrial & Engineering Chemistry Research (2010) 49(14): 6342-6349.

Burlica et al., "Hydrogen generation by pulsed gliding arc discharge plasma with sprays of alcohol solutions", Industrial & Engineering Chemistry Research (2011) 50: 9466-9470.

Burlica et al., "Pulsed plasma gliding arc discharges with water spray", IEEE Transactions on Industry Applications (2008) 44: 482-489.

Davies et al., "Glow-discharge electrolysis. Part I. The Anodic formation of hydrogen peroxide in inert electrolytes", Journal of the Chemical Society, Faraday Transactions (Sep. 1952): 3595-3602.

Friedrich, "Mechanisms of plasma polymerization—Reviewed from a chemical point of view", Plasma Processes and Polymers (2011) 8: 783-802.

Gambus et al., "Oxidation of long chain hydrocarbons by means of low-pressure plasmas", Energy & Fuels (2001) 15: 881-886.

Gesser et al., "The direct conversion of methane to methanol by controlled oxidation", Chemical Reviews (1985) 85: 235-244.

Goujard et al., "Plasma-assisted partial oxidation of methane at low temperatures: Numerical analysis of gas-phase chemical mechanism", Journal of Physics D—Applied Physics (2011) 44(27): 274011. (13 pages).

Hickling et al., "Contact glow-discharge electrolysis", Transactions of the Faraday Society (1964) 60: 783-793.

Hickling, "Electrochemical processes in glow discharge at the gas-solution interface", Modem Aspects of Electrochemistry (1971) 6: 329-373.

Hijikata et al., "Methanol conversion from methane and water vapor by electric discharge (effect of electric discharge process on methane conversion)", Heat Transfer Asian Research (1999) 28: 404-417.

Honorato et al., "(1)H low- and high-field NMR study of the effects of plasma treatment on the oil and water fractions in crude heavy oil", Fuel (2012) 92: 62-68.

Hsieh et al., "Optical diagnostics of electrical discharge water-spray reactors for chemical synthesis", IEEE Transactions on Industry Applications (2013) 49: 305-310.

Hueso et al., "Water plasmas for the revalorisation of heavy oils and cokes from petroleum refining", Environmental Science & Technology (2009) 43: 2557-2562.

Indarto, "A review of direct methane conversion to methanol by dielectric barrier discharge", IEEE Transactions on Dielectrics and Electrical Insulation (2008) 15: 1038-1043.

Jannini et al., "Hydrogen peroxide oxidation of alkanes catalyzed by the vanadate ion-pyrazine-2-carboxilic acid system", Petroleum Chemistry (2005) 45: 413-418.

Jia et al., "Catalytic functionalization of arenes and alkanes via C—H bond activation", Accounts of Chemical Research (2001) 34: 633-639.

Kamata et al., "Efficient stereo- and regioselective hydroxylation of alkanes catalysed by a bulky poloxometalate", Nature Chemistry (2010) 2: 478-483.

(56) References Cited

OTHER PUBLICATIONS

Khani et al., "Investigation of cracking by cylindrical dielectric barrier discharge reactor on the n-hexadecane as a model compound", IEEE Transactions on Plasma Science (2011) 39: 1807-1813.

Kobayashi et al., "The effect of spraying of water droplets and location of water droplets on the water treatment by pulsed discharge in air", IEEE Transactions on Plasma Science (2010) 38: 2675-2680.

Kozlov et al., "The kinetics and mechanisms of cyclohexane oxygenation by hydrogen peroxide catalyzed by a binuclear iron complex", Russian Journal of Physical Chemistry (2003) 77: 575-579.

Kudryashov et al., "Oxidation of hydrocarbons in a barrier discharge reactor", High Energy Chemistry (2000) 34: 112-115.

Kudryashov et al., "Oxidation of hydrocarbons in a bubble plasma reactor", Petroleum Chemistry (2004) 44: 438-440.

Kudryashov et al., "Oxidation of propylene and isobutylene in a reactor with barrier discharge", Russian Journal of Applied Chemistry (2004) 77: 1904-1906.

Kudryashov et al., "Oxidation of propylene with air in barrier discharge in the presence of octane", Russian Journal of Applied Chemistry (2011) 84: 1404-1407.

Kudryashov et al., "Oxidative conversion of cyclohexane in discharge plasma maintained with different high-voltage power sources", High Energy Chemistry (2008) 42: 51-55.

Kudryashov et al., "Simulation of the kinetics of cyclohexane oxidation in a barrier discharge reactor", High Energy Chemistry (2002) 36: 349-353.

Kudryashov et al., "Study of the products of Benzene Transformation in the presence of argon, hydrogen, and propane-butane mixture in barrier discharge", Petroleum Chemistry (2012) 52: 60-64.

Kudryashov et al., "Transformations of n-hexane and cyclohexane by barrier discharge processing in inert gases", High Energy Chemistry (2001) 35: 120-122.

Labinger et al., "Understanding and exploiting C—H bond activation", Nature (2002) 417: 507-514.

Lee et al., "The characteristics of direct hydroxylation of benzene to phenol with molecular oxygen enhanced by pulse DC corona at atmospheric pressure", Plasma Chemistry and Plasma Processing (2003) 23: 519-539.

Locke et al., "Electrohydraulic discharge and nonthermal plasma for water treatment", Industrial & Engineering Chemistry Research (2006) 45:882-905.

Locke et al., "Elementary chemical and physical phenomena in electrical discharge plasma in gas-liquid environments and in liquids", Plasma Chemistry and Catalysis in Gases and Liquids (2012).

Locke et al., "Review of the methods to form hydrogen peroxide in electrical discharge plasma with liquid water", Plasma Sources Science and Technology (2011) 20: 034006.

Lukes et al., "Aqueous-phase chemistry of electrical discharge plasma in water and in gas-liquid environments", Plasma Chemistry and Catalysis in Gases and Liquids (2012) 1st ed. (ch. 7): 243-308.

Lukes et al., "Biological effects of electrical discharge plasma in water and in gas-liquid environments", Plasma Chemistry and Catalysis in Gases and Liquids (2012) 1st ed. (ch. 8): 309-352.

Malik et al., "Preliminary studies on formation of carbonaceous products by pulsed spark discharges in liquid Hydrocarbons", Journal of Electrostatics (2008) 66: 574-577.

Malik et al., "Water purification by electrical discharges", Plasma Sources Science and Technology (2001) 10: 82-91.

Malik et al., "Water purification by plasmas: Which reactors are most energy efficient", Plasma Chemistry and Plasma Processing (2010) 30: 21-31.

Mandelli et al., "Hydrogen peroxide oxygenation of saturated and unsaturated hydrocarbons catalyzed by montmorillonite or aluminum oxide", Catalysis Letters (2009) 132: 235-243.

Monod et al., "Structure-activity relationship for the estimation of OH-oxidation rate constants of aliphatic organic compounds in the aqueous phase: Alkanes, alcohols, organic acids and bases", Atmospheric Environments (2008) 42: 7611-7622.

U.S. Appl. No. 17/711,798, filed Apr. 1, 2022, Plasma Activated Water Production With Membrane Concentration.

* cited by examiner

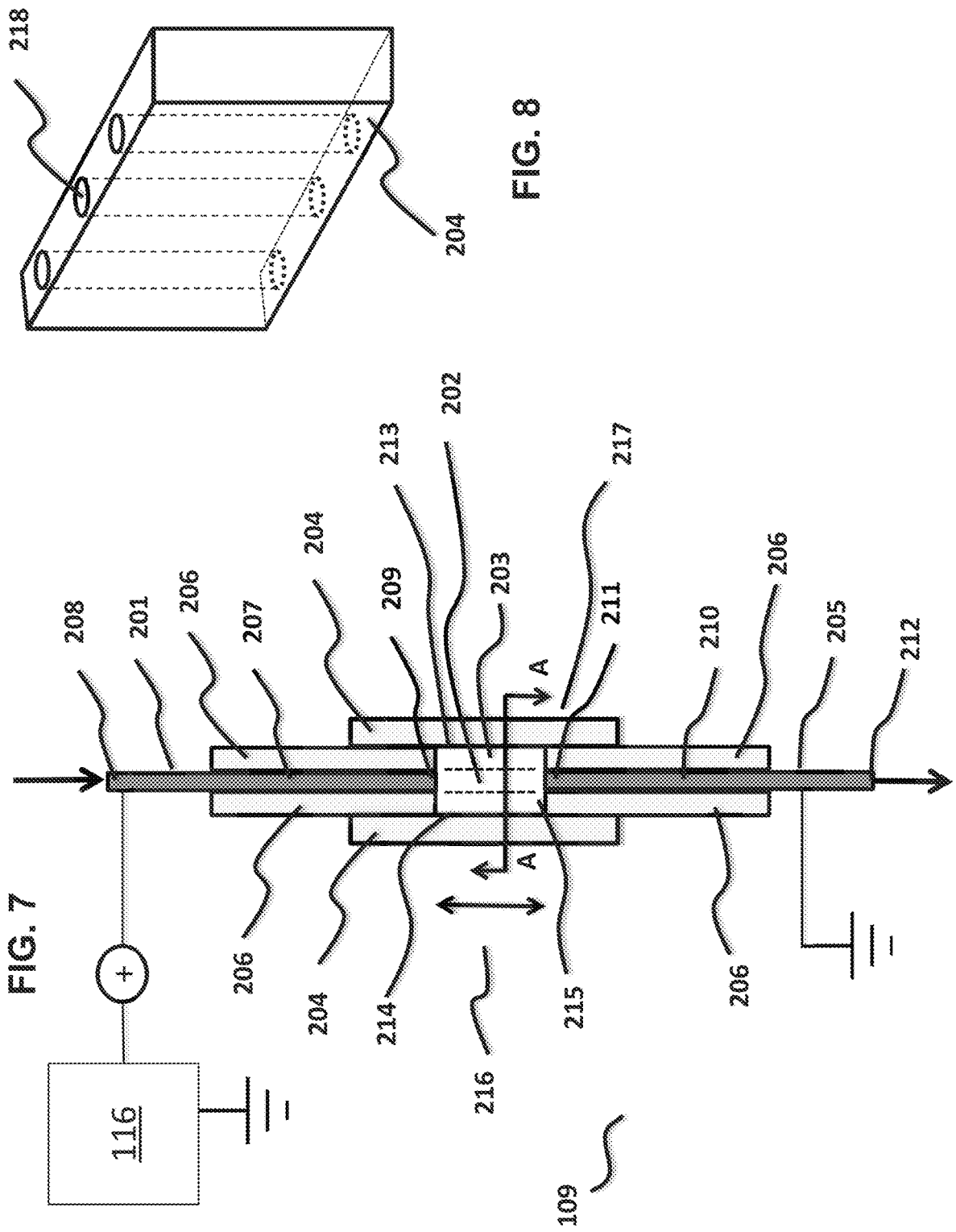

PLASMA ACTIVATED WATER PRODUCTION WITH MEMBRANE CONCENTRATION

CROSS REFERENCE TO RELATED APPLICATIONS

This application is a divisional of U.S. patent application Ser. No. 17/711,798 filed Apr. 1, 2022, which claims priority to U.S. Provisional Patent Application No. 63/170,836 "PLASMA ACTIVATED WATER PRODUCTION WITH MEMBRANE CONCENTRATION," filed Apr. 5, 2021, the contents of which is incorporated herein by reference in its entirety.

FIELD OF THE INVENTION

The present invention relates generally to plasma activated water production.

BACKGROUND OF THE INVENTION

Plasma reactors take a gas stream (typically air) and a pure liquid water stream and produce a mixture, called plasma activated water, which consists of ionic species such as nitrate and nitrite and neutral species including hydrogen peroxide. Such reactors and uses for such reactors are described in Method for Reacting Flowing Liquid and Gas in a Plasma Discharge Reactor, U.S. Pat. No. 9,861,950; Simultaneous On-Site Production of Hydrogen Peroxide and Nitrogen Oxides from Air and Water in a Low Power Flowing Liquid Film Plasma Discharge for Use in Agriculture, U.S. Pat. No. 10,350,572; Gas-Liquid Plasma and Bioreactor System and Method for Remediation of Liquids and Gases, U.S. Pat. No. 10,556,817; and Simultaneous On-Site Production of Hydrogen Peroxide and Nitrogen Oxides from Air and Water in a Low Power Flowing Liquid Film Plasma Discharge for Use in Agriculture, U.S. Pat. No. 10,589,252. The disclosures of these patents are hereby incorporated fully by reference.

SUMMARY OF INVENTION

A plasma activated water production system includes a plasma reactor and a membrane concentrator. The plasma reactor includes a tubular reactor body portion having one or more internal walls that define an internal cavity. At least one electrically-conductive inlet capillary has an inlet capillary body extending between a fluid-receiving tip and a fluid-injecting tip, wherein the fluid-receiving tip is positioned outside the internal cavity, and wherein the fluid-injecting tip is positioned inside the internal cavity. At least one electrically-conductive outlet capillary has an outlet capillary body extending between a fluid-collecting tip and a fluid-ejecting tip, wherein the fluid-collecting tip is positioned inside the internal cavity, and wherein the fluid-ejecting tip is positioned outside the internal cavity, the inlet capillary being aligned with the outlet capillary. A mixing chamber outside of the tubular reactor body has a feed gas inlet, a liquid inlet, and a mixed gas and liquid outlet, the mixed gas and liquid outlet being in fluid communication with the fluid-receiving tip of the electrically conductive inlet capillary. A power source is provided for supplying a voltage across the at least one electrically-conductive inlet capillary and the at least one electrically-conductive outlet capillary. The fluid injecting tip is disposed relative to the fluid collecting tip to generate a flowing liquid film region on the one or more internal walls and a gas stream flowing through the flowing liquid film region, when a fluid is injected into the internal cavity via the at least one electrically conductive inlet capillary. The fluid injecting tip is disposed relative to the fluid collecting tip to propagate a plasma discharge along the flowing liquid film region between the at least one electrically-conductive inlet capillary and the at least one electrically-conductive outlet capillary.

The membrane concentrator includes a plasma activated water flow channel with a plasma activated water inlet and a plasma activated water outlet, a dry gas inlet and a humidified gas outlet. The plasma activated water flow channel includes an ion selective membrane, the membrane concentrator receiving liquid from the plasma reactor, whereby the plasma activated water will contact the ion selective membrane, water will pass through the membrane into the dry gas, and the plasma activated water in the plasma activated water flow channel leaving the membrane concentrator will have increased concentrations of nitrates, nitrites and hydrogen peroxide.

The electrically-conductive inlet capillary can have a first internal diameter, the tubular reactor body can have a second internal diameter, and the electrically conductive outlet capillary can have a third internal diameter. The third internal diameter can be larger than the first internal diameter and smaller than the second internal diameter.

The ion selective membrane can be Nafion®. The ion selective membrane can include polymeric membranes. The polymeric membranes can include at least one selected from the group consisting of polyamides, polyurethanes, poly (bio-amides), polyanilines, polyesters, polyimides, cellulose, and sulfonated polyethersulfone.

The ion selective membrane can include a nanofiltration membrane for nitrate removal. The nanofiltration membrane can be at least one selected from the group consisting of NF90 (Dow-Film Tec, USA), NF270 (Dow-Film Tec, USA) ESNA1-LF (Hydranautics), Nanomax 50 (Millipore), and NTR-7450 Nitto (Denko, Japan).

The ion selective membrane can be a reverse osmosis membrane. The reverse osmosis membrane comprises at least one selected from the group consisting of TM719 (Torray, Japan) and BW 30LE (Dow Film Tec, USA).

The ion selective membrane can be a ceramic membrane. The ceramic membrane can be at least one selected from the group consisting of $SiO_2$, $TiO_2$, $ZrO_2$, and $\gamma\text{-}Al_2O_3$.

The ion selective membrane can include at least one selected from the group consisting of graphene, graphene oxide, carbon-based graphene oxide carbon nanotubes dispersed in a polymer matrix.

The ion selective membrane can have a pore size and structure which retains $H_2O_2$ and passes water.

The plasma activated water production system can further include a recycle conduit for recycling gas and water vapor from the humidified gas outlet of the membrane concentrator to the feed gas inlet conduit of the plasma reactor.

A method for producing plasma activated water can include the steps of:
  providing a continuously flowing plasma reactor;
  injecting a mixture comprising liquid water and a gas into
    at least one electrically-conductive inlet capillary tube
    of the continuously-flowing plasma reactor to generate
    a flowing liquid film region on one or more internal
    walls of the continuously-flowing plasma reactor with
    a gas stream flowing through the flowing liquid film
    region;
  propagating a plasma discharge along the flowing liquid
    film region from the at least one electrically-conductive inlet capillary tube to at least one electrically-conductive outlet capillary tube at an opposing end of the continuously-flowing plasma reactor;

dissociating the liquid water in the plasma discharge to form a plurality of dissociation products;

producing hydrogen peroxide and nitrogen oxides from the plurality of dissociation products;

dissolving the hydrogen peroxide and the nitrogen oxides into the flowing liquid film region; and directing the plasma activated water containing the hydrogen peroxide and the nitrogen oxides to a membrane concentrator comprising a plasma activated water flow channel with a plasma activated water inlet and a plasma activated water outlet, a dry gas inlet and a humidified gas outlet, the plasma activated water flow channel comprising an ion selective membrane, whereby the plasma activated water will contact the ion selective membrane, water will pass through the membrane into the dry gas to create a humidified gas, and the plasma activated water in the plasma activated water flow channel will have increased concentrations of nitrates, nitrites and hydrogen peroxide.

The method can include the step of recycling the humidified gas from the humidified gas outlet of the membrane concentrator to the plasma reactor.

A plasma activated water production system can include a plasma reactor and a membrane concentrator. The plasma reactor includes a tubular reactor body portion having one or more internal walls that define an internal cavity. At least one electrically-conductive inlet capillary has an inlet capillary body extending between a fluid-receiving tip and a fluid-injecting tip, wherein the fluid-receiving tip is positioned outside the internal cavity, and wherein the fluid-injecting tip is positioned inside the internal cavity. At least one electrically-conductive outlet capillary has an outlet capillary body extending between a fluid-collecting tip and a fluid-ejecting tip, wherein the fluid-collecting tip is positioned inside the internal cavity, and wherein the fluid-ejecting tip is positioned outside the internal cavity, the inlet capillary being aligned with the outlet capillary. A mixing chamber outside of the tubular reactor body has a feed gas inlet, a liquid inlet, and a mixed gas and liquid outlet. The mixed gas and liquid outlet is in fluid communication with the fluid-receiving tip of the electrically conductive inlet capillary. A power source is provided for supplying a voltage across the at least one electrically-conductive inlet capillary and the at least one electrically-conductive outlet capillary. The fluid injecting tip is disposed relative to the fluid collecting tip to generate a flowing liquid film region on the one or more internal walls and a gas stream flowing through the flowing liquid film region, when a fluid is injected into the internal cavity via the at least one electrically conductive inlet capillary. The fluid injecting tip is disposed relative to the fluid collecting tip to propagate a plasma discharge along the flowing liquid film region between the at least one electrically-conductive inlet capillary and the at least one electrically-conductive outlet capillary.

An electrodialysis membrane concentrator includes concentrate and diluate plasma activated water flow channels separated by an ion exchange membrane. The plasma activated water flow channels communicate with one of an anode and a cathode. The anode and cathode are connected to a voltage source for creating a potential difference across the ion exchange membrane, wherein ions in flowing in plasma activated water flow streams flowing through the plasma activated water flow channels will pass through the ion exchange membrane to form a concentrate flow stream and a diluate flow stream in the plasma activated water flow channels.

The ion exchange membrane can be an anion exchange membrane and can includes at least one selected from the group consisting of polymer binders, anion exchange resins and additives. The polymer binders can include chlorinated polypropylene. The anion exchange resins can include styrene-divinyl benzene cross-linked copolymers. The additives can include activated carbon particles.

The plasma activated water production system can further include a recycle conduit for recycling a portion of the concentrated flow stream to an inlet side of the concentrated plasma activated water flow channel.

BRIEF DESCRIPTION OF THE DRAWINGS

There are shown in the drawings embodiments that are presently preferred it being understood that the invention is not limited to the arrangements and instrumentalities shown, wherein:

FIG. 7 is a schematic longitudinal cross section of a plasma reactor according to various embodiments;

FIG. 8 shows a schematic perspective view, partially in phantom, of a casing according to various embodiments;

DETAILED DESCRIPTION OF THE INVENTION

Figure 1:
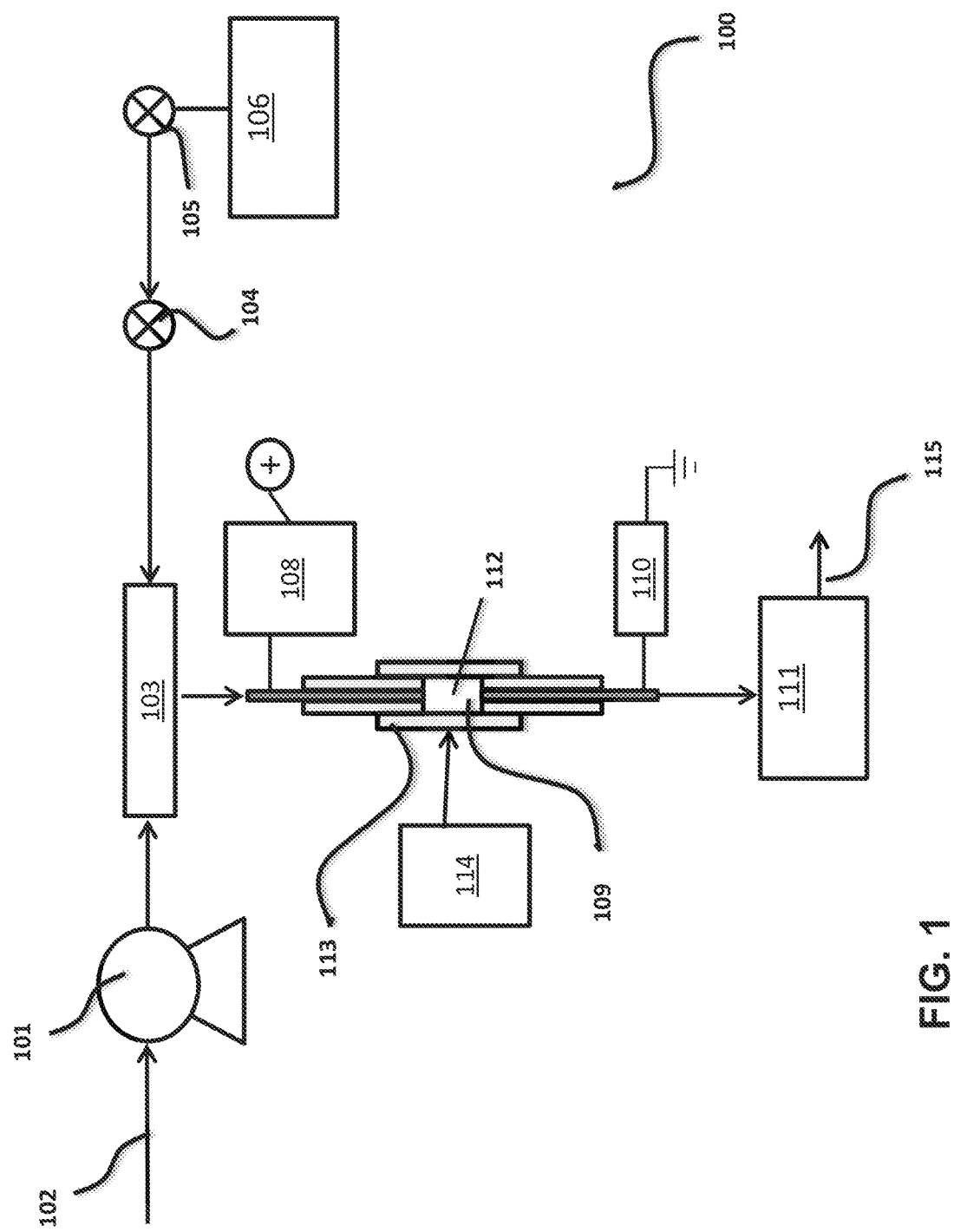
FIG. 1 is a schematic diagram of a plasma activated water production system with a membrane concentrator.

Electrical discharge plasma contacting liquid phases has been studied for a wide range of chemical, biomedical, environmental, and materials synthesis applications. The synthesis of a number of organic and inorganic compounds by gas-liquid plasma utilize a variety of different electrode configurations including cases where both electrodes are in the gas phase and cases where one electrode is placed inside the liquid phase and one in the gas phase. A wide range of gas-liquid contacting schemes has been studied including falling films, aerosol sprays, and bubble injection into liquids. It has been shown that the presence of the liquid phase not only affects plasma properties such as electron energy and density, but also the chemical reactions which take place. The liquid phase can also serve as a source of additional vapor phase reactant as well as function as a reservoir to collect the generated products, protecting those products from degradation by direct electron attack in the gas phase plasma.

For chemical synthesis in gas-liquid plasma discharges the reactions that occur depend on the chemical makeup of both the liquid and the carrier gas. In the simplest case a noble gas (e.g., argon or helium) can be used in conjunction with water in order to reduce the number of reactive chemical species and produce stable products containing only hydrogen (H) and oxygen (O). Under these conditions water molecules are dissociated in the gas phase plasma into hydroxyl radicals (·OH) which combine to form hydrogen peroxide ($H_2O_2$) molecules that in turn rapidly dissolve into the liquid phase where they are protected from degradation by the plasma and can be easily collected.

When a carrier gas such as air (or $N_2/O_2$ mixture) is used in conjunction with liquid water the reactive chemical species in the gas stream can react with the hydroxyl radicals formed from the water to generate other oxidized products. When air ($O_2$, $N_2$) is subjected to a plasma discharge NOx is formed after dissociation of the diatomic species present in the gas. The formed NOx molecules in the gas phase (e.g. NO, $NO_2$) can then be oxidized into nitrites ($NO_2^-$) and nitrates ($NO_3^-$) by hydroxyl radicals and other reactions. Similar to hydrogen peroxide, the formed nitrites and nitrates rapidly dissolve into the liquid phase where they are protected from degradation by the plasma and can be easily collected. In the presence of hydrogen peroxide peroxynitrite ($ONOO^-$) can also be formed by reaction with nitrite and which leads to further conversion of nitrite to nitrate in post-plasma conditions.

Various embodiments relate to a system which can be used in agriculture to generate both nitrate and hydrogen peroxide on-site to be introduced directly into an irrigation system where the only chemical feeds required are air and water. Further, by manipulating the flow rates of these reactants into the system the relative concentrations of the generated products can be varied to fit the requirements of specific applications. For applications which require higher hydrogen peroxide concentrations argon gas could be supplemented into the gas phase in order to increase generation.

Various embodiments relate to a method that includes injecting a mixture comprising liquid water and a gas, into at least one electrically-conductive inlet capillary tube of a continuously-flowing plasma reactor to generate a flowing liquid film region on one or more internal walls of the continuously-flowing plasma reactor with a gas stream flowing through the flowing liquid film region; propagating a plasma discharge along the flowing liquid film region from at least one electrically-conductive inlet capillary to an electrically-conductive outlet capillary tube at an opposing end of the continuously-flowing plasma reactor; dissociating the liquid water in the plasma discharge to form a plurality of dissociation products; producing hydrogen peroxide and nitrogen oxides (e.g., typical gas species: NO, $NO_2$) typical liquid species: $NO_2^-$, $NO_3^-$ from the plurality of dissociation products; dissolving the hydrogen peroxide and the nitrogen oxides into the flowing liquid film region; recovering at least a portion of the hydrogen peroxide and the nitrogen oxides in the liquid from the electrically conductive outlet capillary; and concentrating the liquid phase hydrogen peroxide and/or nitrogen oxides in a membrane concentrator which is permeable to water and cations and impermeable to the anionic nitrogen oxides such as nitrite and nitrate and hydrogen peroxide. The nitrogen oxides and the hydrogen peroxide are dissolved into the flowing liquid film region and are therefore protected from degradation.

Concentrations of nitrate in a range desired by farmers are usually about 20 to 250 mg/l (N). Typically, farmers will dilute concentrated solutions to this range for use directly on plants. The concentrations can vary within the range of 1 mg/l to 200 g/l with subsequent dilution prior to use. Plasma discharge reactors can sometimes produce 20 to 50 mg/l, but to provide a range of concentrated solutions to 200 g/l would allow for storage of more concentrated solutions, which takes up less storage space and thus is more economical to store, transport, and subsequently apply. The $H_2O_2$ reacts to convert nitrite to nitrate (via peroxynitrite reactions) so there is a correlation between the $H_2O_2$ and the nitrite/nitrate ratio. The $H_2O_2$ concentrations are also variable (and correlated to the nitrite/nitrate), but normally are about 10 to 20 mM $H_2O_2$. As the concentration of nitrate rises the range for the $H_2O_2$ will also increase, such that at 200 mg/l nitrate there will be about 3 mM $H_2O_2$.

The invention utilizes a membrane concentration apparatus and procedure wherein in one embodiment an ion selective membrane is utilized to concentrate the mixture of nitrogen oxide ions and hydrogen peroxide in the liquid phase products leaving the plasma reactor. The design of the membrane reactor can vary, and can be tube in shell or plate type, or other designs. The outlet stream of the plasma reactor, which contains water, nitrites, nitrates, and $H_2O_2$, flows across the membrane. The membrane is permeable to water, which crosses the membrane. The membrane is resistant to passing anions such as the nitrates and nitrites, and also $H_2O_2$, and so these products are concentrated in the product stream leaving the membrane concentrator. Higher nitrate, nitrite, and $H_2O_2$ concentrations and the ability to control the concentration improve the range of applications for this process in farming and other agricultural applications. An ion exchange membrane can alternatively be used to preferentially pass ions in an electrodialysis process.

The material making up the ion selective membrane can vary. Nafion® (The Chemours Company, Wilmington Delaware) is a sulfonated tetrafluoroethylene based fluoropolymer-copolymer known to retain both anionic species and hydrogen peroxide while evaporating water across the membrane into a dry gas stream.

Other ion selective membranes are possible. Major types are a) anion exchange membranes for use in electrodialysis and b) nanopore structured. (Santafe-Moros, A.; Gozalvez-Zafrilla, J. M.; Lora-Garcia, J. Performance of commercial nanofiltration membranes in the removal of nitrate ions. *Desalination* 2005, 185 (1-3), 281-287. DOI: 10.1016/j.desal.2005.02.080. Guo, H.; Li, X. H.; Yang, W. L.; Yao, Z. K.; Mei, Y.; Peng, L. E.; Yang, Z.; Shao, S. L.; Tang, C. Y. Nanofiltration for drinking water treatment: a review. *Frontiers of Chemical Science and Engineering*. DOI: 10.1007/s11705-021-2103-5). The disclosure of these references are hereby incorporated fully by reference. Both types are available commercially, but many groups are making tailored membranes for specific applications and study and to improve selectivity and other properties. Electrodialysis is a more complex process that requires an applied electric field and combinations of anion and cation selective membranes and some other membranes to separate various ions. This has been applied to wastewater and others to remove nitrate, fluoride, and chlorate as well as other pollutants. Nitrate can also be removed from wastewater using the combination of an anion selective membrane and a bioreactor—the membrane is used to allow nitrate to pass through to a layer with a biological matrix where the cells denitrify the nitrate (convert it to gaseous nitrogen).

Alternative membranes can be used to concentrate nitrate solutions through allowing water to pass through the membrane and rejecting (or retaining) the nitrate include nanofiltration (NF), reverse osmosis (RO) and ultrafiltration (UF) membranes. These include polymeric membranes, ceramic membranes, and others based on graphene and metal organic frameworks.

Polymeric nanomembranes for water treatment generally have a porous support with a thin film composite layer and a non-woven fabric support. The thin layer, called the rejection layer, is usually made of polyamide. Alternatives to polyamide include: polyurethanes, poly(bio-amides), polyanilines, polyesters, polyimides, cellulose based layers, and sulfonated polyethersulfone.

Example commercial nanofiltration membranes used for nitrate removal include: a) NF90, NF270 (Dow-Film Tec, USA b) ESNA1-LF (Hydranautics), c) Nanomax 50 (Millipore), and d) NTR-7450 Nitto (Denko, Japan). The most commonly used NF membranes are polyamide-based membranes. Some membranes can be modified to improve the rejection of nitrate through the addition of negative components such poly(sodium 4-styrenesulfate), to enhance negative electrostatic repulsion. Commercial reverse osmosis membranes used for nitrate removal include TM719 (Torray, Japan) and BW 30LE (Dow Film Tec, USA).

Ceramic nanomembranes have similar pore sizes as the polymeric nanomembranes of 1-2 nanometers with molecular weight cutoffs from 200 to 1000 Daltons. Ceramic membranes can be made of metal oxides ($SiO_2$, $TiO_2$, $ZrO_2$) and mixed metal oxides. Membranes developed for ultrafiltration such as $\gamma$-$Al_2O_3$ can also be used to remove nitrate from water.

In addition to the polymeric and ceramic nanomembranes mentioned above, other nanomembranes can be made of graphene, graphene oxide, and metal organic framework. Membranes with carbon-based graphene oxide carbon nanotubes (CNT) dispersed within polymer matrices have also been used in water treatment.

Another way to concentrate nitrate ions is by electrodialysis (ED). In such a system, a low voltage electric field generated by a DC electrical power supply is applied across a chamber with an anion selective membrane to drive ions from a solution to be purified into another solution with high concentration (see FIG. 4). Some systems can use combinations of anion exchange membranes (AEM) and cation exchange membranes (CEM) depending upon the application and the need to separate metal ions or other cations. ED, AEM, and CEM are all available commercially and some researchers and suppliers custom make their own membranes and ED systems.

Electrodialysis for nitrate removal from water requires anion exchange membranes (AEM) that can transport nitrate through the membrane. There are various types of anion exchange membranes and they can include three elements: polymer binders (such as chlorinated polypropylene), anion exchange resins, and additives. Anion exchange resins can be styrene-divinyl benzene cross-linked copolymers (Amberlite® IRA-402 and Lewatit®, Sybron Ionac® SR-7 by Merck KGaA, Darmstadt Germany; Purolite® A600/9413 by MemBrain® s.r.o., Straz pdo Ralskem, Czech Republic). Additives often are activated carbon particles to enhance hydrophobicity. Package systems for ED are available from companies (e.g., Deukum GmbH, Germany). Other manufacturers of AEM include (Astom Corp. Tokyo, Japan; Straz pdo Ralskem, Czech Republic; Tokuyama Soda, Japan) but there are many others.

FIG. 1 shows a schematic diagram of a system and process 100 according to various embodiments. A high pressure carrier gas may be added to the mixing zone 103 from a high pressure storage container 106 via a pressure regulator 105. The flow rate of the high pressure carrier gas may be measured by a rotameter 104. Simultaneously, deionized (DI) water 102 can be pumped via a pump 101, such as a high-pressure pulse injection pump, into the mixing zone 103. The mixing zone 103 may be any suitable structure. For example, the mixing zone 103 may simply be a tee joint, such as a nylon Swagelok® (Swagelok Company, Colon OH) tee joint. After mixing in the mixing zone 103, all of the contents of the mixing zone may be passed to, added to, or injected to a reactor 109. The contents of the mixing zone 103 when added to the reactor 109 can generate a flowing liquid film region on one or more internal walls of the reactor 109 with a gas stream flowing through the flowing liquid film region. A power source may supply a voltage across at least one electrically-conductive inlet capillary and at least one electrically-conductive outlet capillary of the reactor. A high voltage (HV) probe 108 can be used to measure the voltage applied to the reactor. At the outlet of the reactor a shunt 110 can be used to measure the electrical current and thereby in combination with the voltage determine the power delivered to the reactor. A plasma discharge may be propagated along the flowing liquid film region from at least one electrically-conductive inlet capillary to an electrically-conductive outlet capillary tube at an opposing end of the continuously-flowing plasma reactor 109. The reactor 109 may, therefore, include a plasma discharge region 112. According to certain preferred embodiments, the plasma discharge region 112 may be bounded by a casing 113. The casing may be optically transparent to allow emission spectroscopy and/or high-speed imaging to be performed on the plasma discharge region 112 of the reactor 109 via an imaging apparatus 114. For example, a chemical analysis of the contents of the reactor 109 can be performed using optical emission spectroscopy (OES), which measures the intensity of light emitted from a flame, plasma, arc, or spark at a particular wavelength to determine properties of the plasma (e.g., electron density, electron energy, or plasma gas temperature). As a result of the plasma discharge, the liquid water in the plasma discharge may be dissociated to form a plurality of dissociation products. Hydrogen peroxide and nitrogen oxides (e.g., gas: NO, $NO_2$; liquid $NO_2^-$, $NO_3^-$) may be produced from the plurality of dissociation products. The hydrogen peroxide and the nitrogen oxides may be dissolved into the flowing liquid film region. At least a portion of the hydrogen peroxide and the nitrogen oxides may be recovered from the electrically conductive outlet capillary. A membrane concentrator 111 may be used to collect the liquid exiting the reactor for use and/or subsequent chemical analysis via a gas effluent exit 115.

Figure 2:
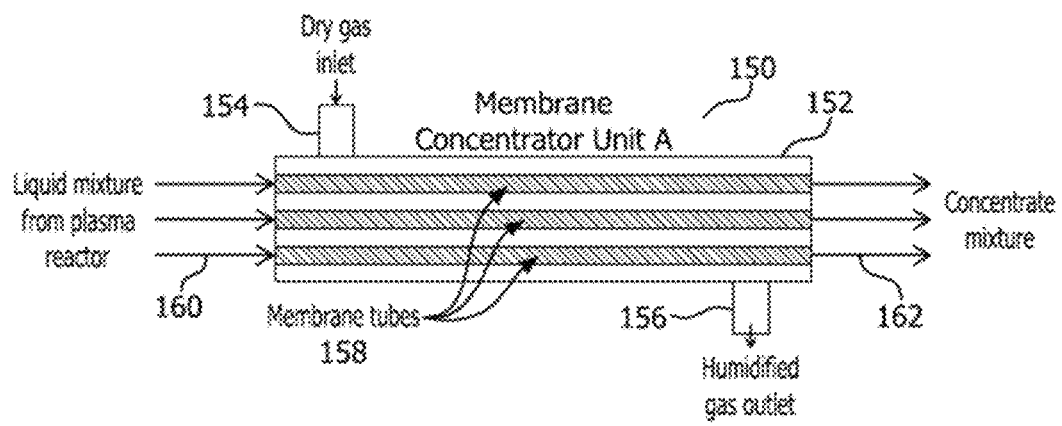
FIG. 2 is a schematic diagram of a membrane concentrator.

One form of the membrane concentrator is shown in FIG. 2. The membrane concentrator 150 includes a housing 152 having a dry gas inlet 154 and a humidified gas outlet 156. A plurality of membrane tubes 158 made of an ion selective membrane are provided in the housing 152 and receive liquid mixture 160 from the plasma reactor and emit a concentrated mixture 162. The liquid mixture enters the ion selective membrane tubes and water is evaporated across the membrane into the dry gas. The dry gas flows from the dry gas inlet across the membrane tubes and leaves as a humidified gas through humidified gas outlet 156. The liquid leaves the membrane tubes 158 as a concentrated mixture 162 with elevated concentrations of nitrates, nitrites and $H_2O_2$ since only water can pass through the membrane and the nitrates, nitrites, and hydrogen peroxide are retained in the liquid solution. The size and gas flow rates of the unit will depend upon the desired levels of concentration of the nitrite, nitrate and $H_2O_2$ mixtures.

Figure 3:
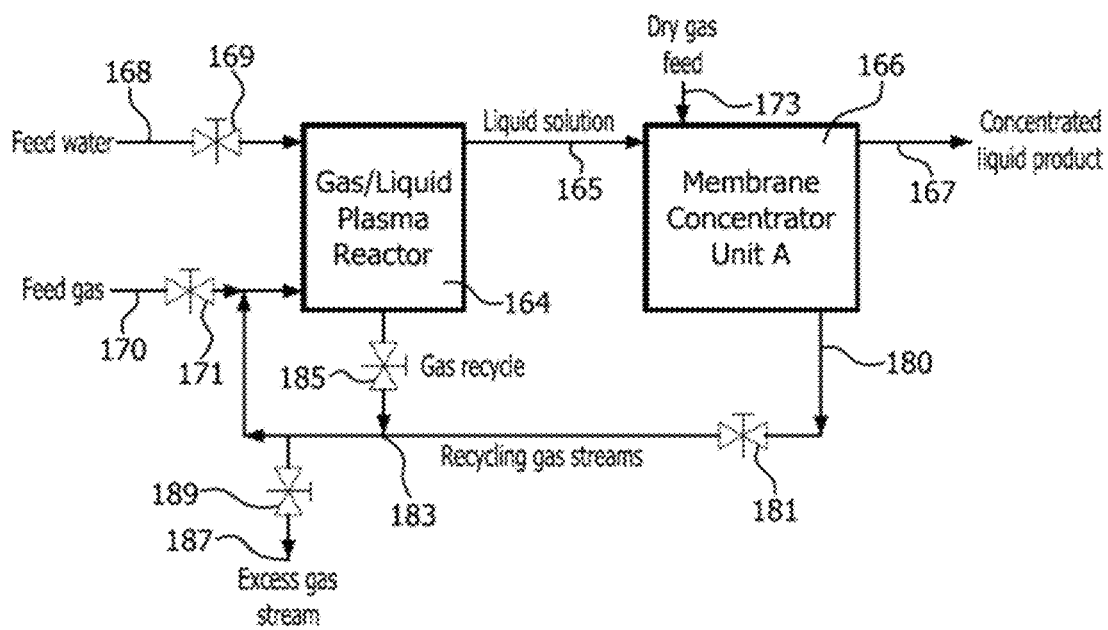
FIG. 3 is a schematic diagram of a plasma activated water production system with a membrane concentrator and recycle.

A system with recycle is shown in FIG. 3. In this modification, the gas stream leaving the membrane concentrator will be recycled to the plasma reactor providing a means to more efficiently utilize the feed gas. In addition, the gas stream from the plasma reactor will be recycled so as to enhance the efficiency of the nitrogen oxide conversions to nitrate and nitrite and other nitrogen species dissolved in the liquid. There is shown in FIG. 3 a gas/liquid plasma reactor 164 with a membrane concentrator 166 connected by liquid solution conduit 165. Feed water enters the plasma reactor 164 through a feed water inlet conduit 168 which can be controlled by a valve 169. Feed gas enters the plasma reactor 164 through a feed gas conduit 170 that can be controlled by a valve 171. As previously described the plasma reactor 164 creates ionic species such as nitrates and nitrites and neutral species such as $H_2O_2$. Liquid water containing nitrates, nitrites and $H_2O_2$ is conveyed by the conduit 165 to the membrane concentrator unit 166. There the water passes through the ion selective membrane and is drawn into the flowing dry gas. The dry gas enters the membrane concentrator through a dry gas feed 173 and exits through a humidified gas outlet 180. Concentrated liquid product containing concentrated amounts of nitrates, nitrites and $H_2O_2$ to exit the membrane concentrator through an exit conduit 167 and can be passed to storage.

The humidified gas outlet 180 in this embodiment is recycled to the feed gas inlet conduit 170. A control valve 181 can be provided for the recycling gas streams. A recycle gas conduit 183 can be provided from the plasma reactor 164 and controlled by a valve 185. Excess gas can be withdrawn from the system through an exhaust line 187 controlled by valve 189.

The flowing liquid film region in the plasma reactor may have an annular shape. The pulse plasma discharge may have a frequency of from about 100 to 100,000 Hz. The liquid water may have a temperature of from greater than 0 to less than 100 degrees Celsius and the reactor may have a pressure of from approximately 0.1 to 2 bar. The liquid water may have a conductivity of near 1 microSiemens/cm (µS/cm) to 50 milliSiemens/cm (mS/cm). The gas may be air. The at least one electrically-conductive inlet capillary and the at least one electrically-conductive outlet capillary may include an electrically conductive material. The electrically conductive material may include stainless steel, nickel alloys, chromium alloys, titanium alloys, molybdenum alloys, copper alloys, gold alloys, platinum alloys, zinc alloys, zirconium alloys, and combinations thereof.

Embodiments of the invention relate to a reactor system that includes a single reactor. Other embodiments relate to a reactor system that may include a casing having a plurality of internal cavities; and a plurality of reactor assemblies arranged in parallel, wherein each of the plurality of reactor assemblies includes: at least one electrically-conductive inlet capillary having an inlet capillary body extending between a fluid-receiving tip and a fluid-injecting tip, wherein the fluid-receiving tip is positioned outside one of the plurality of internal cavities, and wherein the fluid-injecting tip is positioned inside one of the plurality of internal cavities; at least one electrically-conductive outlet capillary having an outlet capillary body extending between a fluid-collecting tip and a fluid-ejecting tip, wherein the fluid-collecting tip is positioned inside one of the plurality of internal cavities, and wherein the fluid-ejecting tip is positioned outside one of the plurality of internal cavities, wherein the fluid injecting tip is disposed relative to the fluid collecting tip to generate a flowing liquid film region on an internal wall of one of the plurality of internal cavities and a gas stream flowing through the flowing liquid film region, when a fluid is injected into the internal cavity via the at least one electrically conductive inlet capillary, and wherein the fluid injecting tip is disposed relative to the fluid collecting tip to propagate a plasma discharge along the flowing liquid film region between the at least one electrically-conductive inlet capillary and the at least one electrically-conductive outlet capillary. The fluid injecting tip may be aligned with the fluid collecting tip. A gap may separate the fluid-injecting tip and the fluid-collecting tip. The gap may have a length, and a ratio of the voltage to the length may be at least about $2.5 \times 10^5$ V/m. The reactor system may also include a power source, supplying a voltage across the at least one electrically-conductive inlet capillary and the at least one electrically-conductive outlet capillary. The power source may be adapted to provide a pulsed current between the at least one electrically-conductive inlet capillary and the at least one electrically-conductive outlet capillary. The power source may be adapted to provide a D.C. current between the at least one electrically-conductive inlet capillary and the at least one electrically-conductive outlet capillary. The power source may be adapted to provide an A.C. current between the at least one electrically-conductive inlet capillary and the at least one electrically-conductive outlet capillary.

Figure 4:
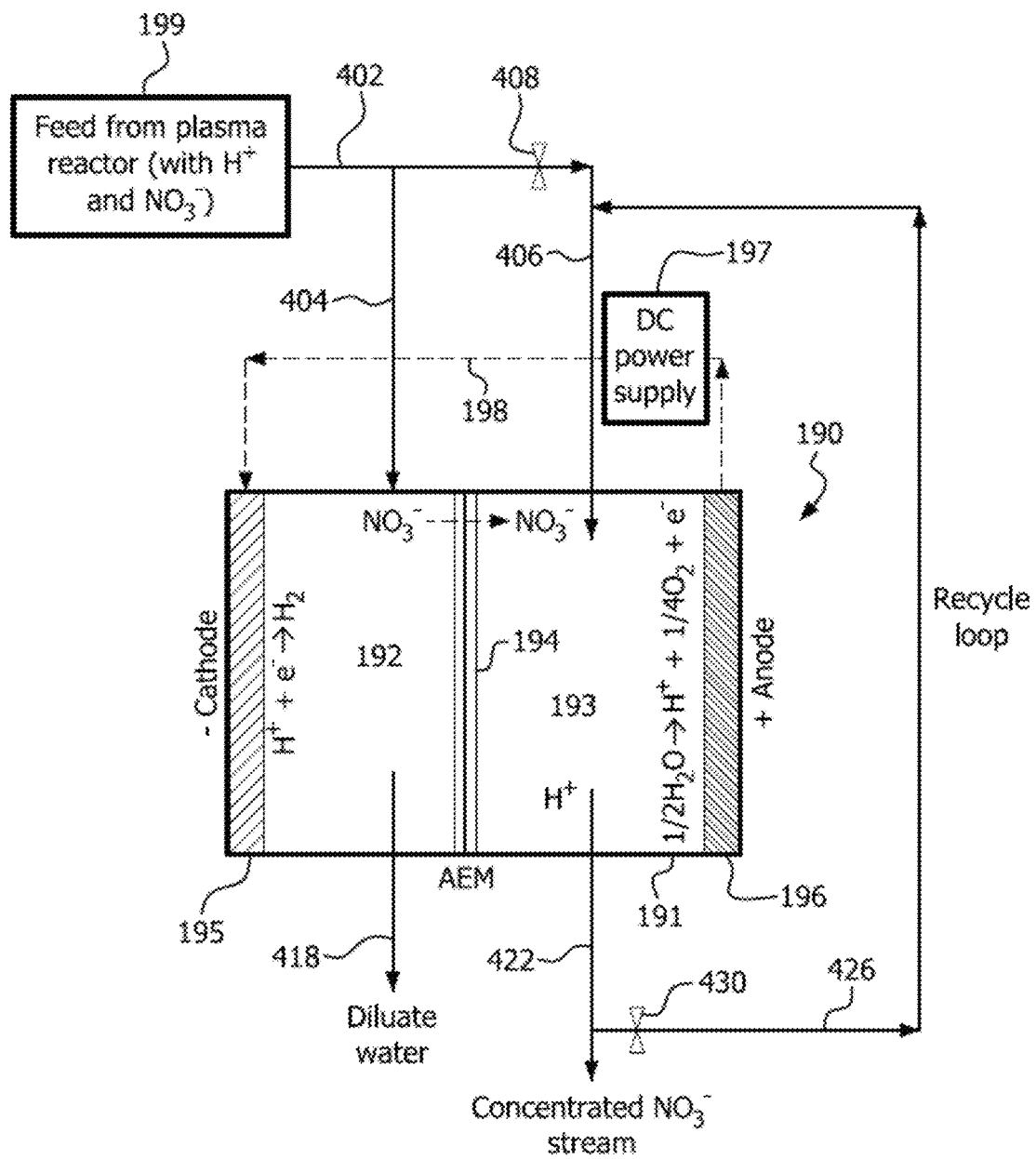
FIG. 4 is a schematic diagram of a membrane concentrator utilizing ion exchange and electrodialysis.

Another way to concentrate nitrate ions is by electrodialysis (ED). In such a system, a low voltage electric field generated by a DC electrical power supply is applied across a chamber with an anion selective membrane to drive ions from a solution to be purified into another solution with high concentration. An example of such a system is shown in FIG. 4. An electrolysis membrane concentrator 190 includes a housing 191 a diluate compartment 192 and a concentrate compartment 193 divided by an ion exchange membrane 194. A cathode 195 adjoins the feed compartment 192 and an anode 196 adjoins the concentrate compartment 193. A DC power supply 197 connects the cathode 195 and anode 196 as by electrical connection 198. Feed from a plasma reactor as previously described flows from a feed source 199 communicating with the plasma reactor.

The feed from the plasma reactor enters through a conduit 402 and an inlet conduit 404 leading to the diluate compartment 192. A second inlet conduit 406 can communicate with the concentrate compartment 193 and can be controlled by valve 408. As shown, $NO_3^-$ ions preferentially cross the ion exchange membrane 194 into the concentrate compartment 193. Purified water leaves the diluate compartment 192 as shown by arrow 418. A concentrated $NO_3^-$ stream leaves the concentrate compartment 193 as shown by arrow 422. A recycle loop 426 can be provided to communicate with the second inlet conduit 406 so as to increase the $NO_3^-$ concentration. A valve 430 can be used to control the recycle stream, along with the valve 408 controlling the feed stream to the second inlet conduit 406.

Some systems can use combinations of anion exchange membranes (AEM) and cation exchange membranes (CEM) depending upon the application and the need to separate unwanted metal ions or other cations which would be retained on the diluate side. ED, AEM, and CEM are all available commercially and some researchers and suppliers custom make their own membranes and ED systems.

Electrodialysis for nitrate removal from water requires anion exchange membranes (AEM) that can transport nitrate through the membrane. There are various types of anion exchange membranes and they can include three elements: polymer binders (such as chlorinated polypropylene), anion exchange resins, and additives. Anion exchange resins can be styrene-divinyl benzene cross-linked copolymers (Amberlite® IRA-402 and Lewatit®, Sybron Ionac® SR-7 by Merck KGaA, Darmstadt Germany; Purolite® A600/9413 by MemBrain® s.r.o., Straz pdo Ralskem, Czech Republic). Additives often are activated carbon particles to enhance hydrophobicity. Package systems for ED are available from companies (e.g., Deukum GmbH, Germany). Other manufacturers of AEM include (Astom Corp. Tokyo, Japan; Straz pdo Ralskem, Czech Republic; Tokuyama Soda, Japan). There are many others that are suitable and included within the scope of the invention.

Figure 5:
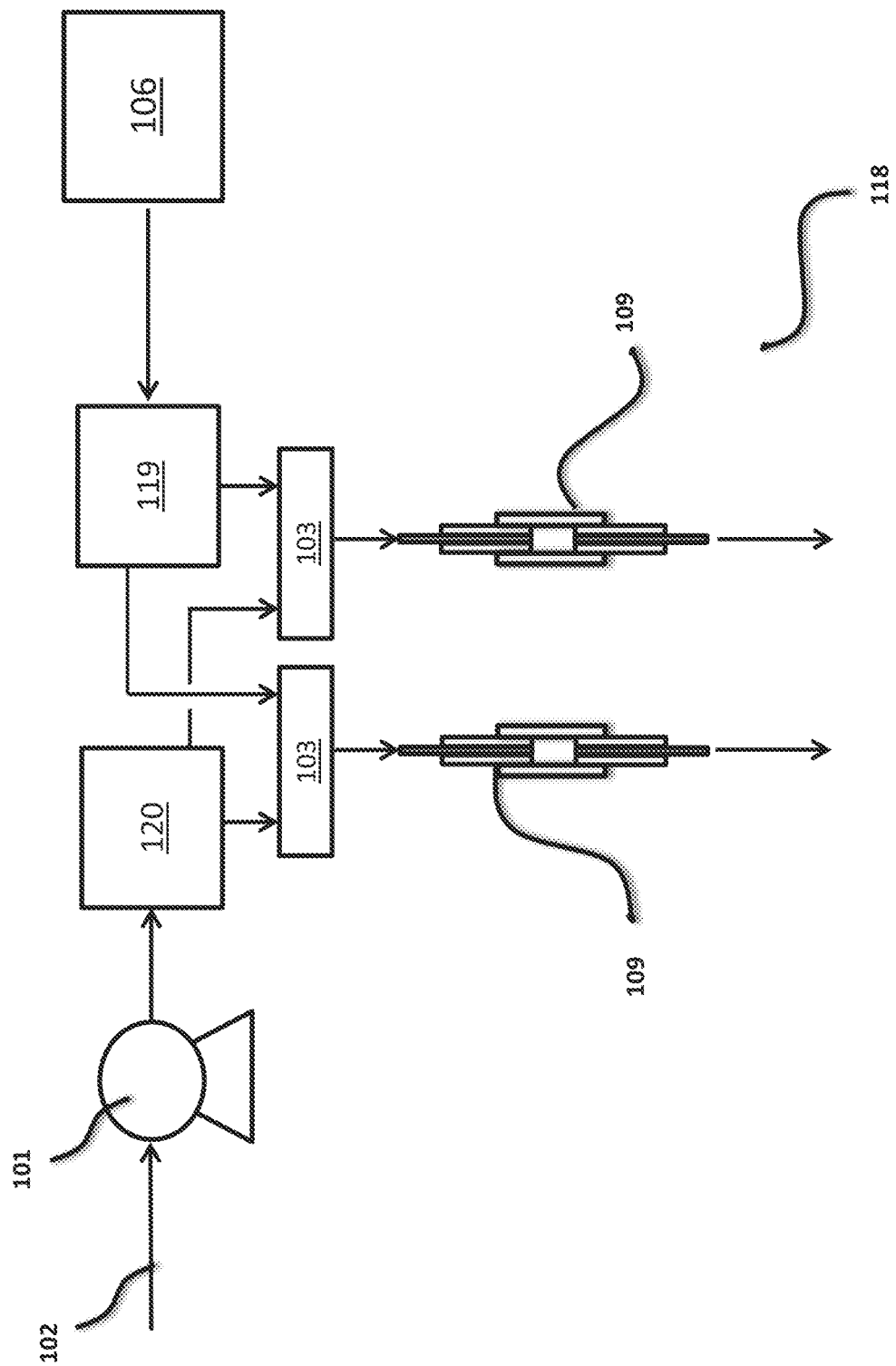
FIG. 5 is a schematic diagram of an embodiment of the invention incorporating multiple plasma reactors.

FIG. 5 illustrates an embodiment of the system and process 118 wherein a plurality of reactors 109 are connected in parallel. All details of the system and process can be the same as those illustrated in FIG. 1, except as otherwise noted. Any number of reactors 109 may be operated in parallel, although only two reactors 109 are so illustrated. In parallel operation, the high pressure storage container 106 may supply the high pressure carrier gas to a gas splitting region 119, which may divert the high pressure carrier gas stream to a plurality of mixing zones 103. Similarly, the pump 101 may supply the deionized water 102 to a water splitting region 120, which may divert the deionized water 102 to the plurality of mixing zones 103. Just as in the embodiment illustrated in FIG. 1, the after mixing in each of the plurality of mixing zones 103, the contents of each mixing zone may be passed to, added to, or injected to one of the plurality of reactors 109. The liquid, comprising the reaction products, as described with respect to FIG. 1, may be discharged from each of the plurality of reactors 109 at an approximately equal flow rate.

Figure 6:
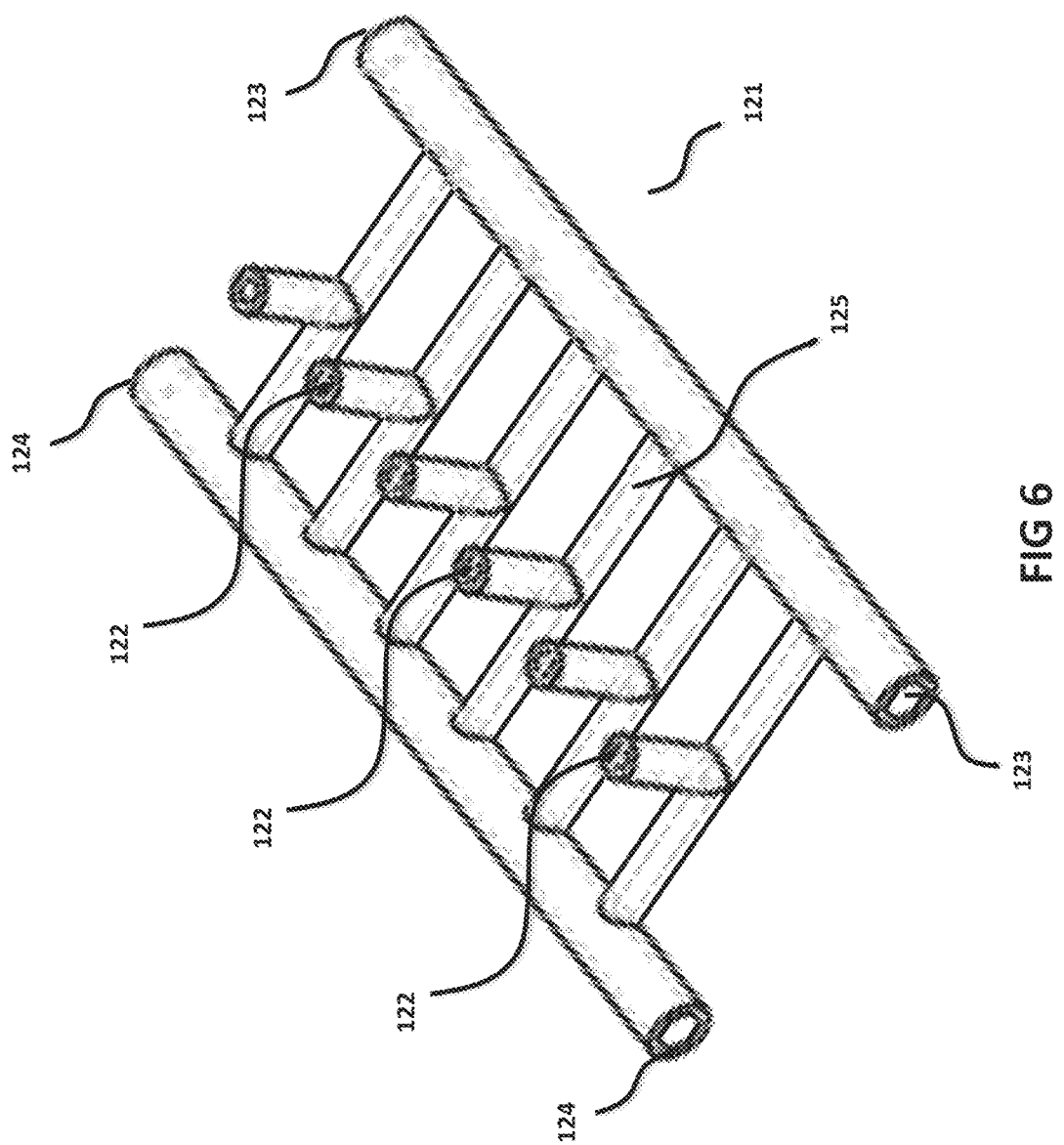
FIG. 6 is a schematic diagram of a manifold useful for operating a plurality of reactors in parallel, according to various embodiments.

FIG. 6 illustrates a manifold 121 useful in various embodiments wherein a plurality of reactors 109 are connected in parallel. The manifold 121 includes one or more gas inlets 124 and one or more water inlets 123. The one or more gas inlets 124 and the one or more water inlets 123 can supply gas and water, respectively, to a plurality of mixing zones 125. Each of the mixing zones 125 may include an outlet 122 for discharging a water/gas mixture to a respective one of the plurality of reactors 109. The manifold 121 may be made from any suitable material. A preferable material is plastic or other non-electrically conducting material. The manifold 121 may be manufactured by any suitable means, including but not limited to welding, gluing, or 3D printing. As illustrated in FIG. 6, the manifold 121 can include a plurality of tubular components. The tubular components may be of any suitable size. According to certain embodiments, however, the tubular components may have a wall thickness of about 1/16 inch and an internal diameter of about 1/8 inch.

FIG. 7 shows an illustration of a vertical cross section of a single plasma reactor 109, enclosed in a casing 204. The casing 204 may be cylindrical, or any suitable shape. For example, in FIG. 8, a slab-shaped casing 204 is illustrated. The slap-shaped casing includes a plurality of through-holes 218 into which the other components of the reactor 109 may be fitted. The slab-shaped casing 204 is particularly useful for operating a plurality of plasma reactors 109.

The specific features of any given plasma reactor 109, are illustrated in greater detail in FIG. 7. Various embodiments of the reactor 109 provide simple construction from prefabricated materials. An added benefit to such embodiments is that they can be considered "disposable."

The reactor 109 can include a body portion 217 having one or more internal walls 213, 214 that define an internal cavity 215. For a tubular geometry internal walls 213 and 214 may be the same wall. According to various embodiments, the body portion 217 may be cylindrical. Other geometric shapes are possible.

The reactor 109 can include at least one electrically-conductive inlet capillary 201 having an inlet capillary body 207 extending between a fluid-receiving tip 208 and a fluid-injecting tip 209. The fluid-receiving tip 208 is positioned outside the internal cavity 215, and the fluid-injecting tip 209 is positioned inside the internal cavity 215.

The reactor can include at least one electrically-conductive outlet capillary 205 having an outlet capillary body 210 extending between a fluid-collecting tip 211 and a fluid-ejecting tip 212. The fluid-collecting tip 211 is positioned inside the internal cavity 215, and the fluid-ejecting tip 212 is positioned outside the internal cavity 215.

The electrically-conductive inlet capillary 201 and the electrically-conductive outlet capillary 205 can be made of any electrically conductive material, for example, according to one particularly preferred embodiment the electrically-conductive inlet capillary 201 and the electrically-conductive outlet capillary 205 can be made of 316 stainless steel capillary tubing with an outer diameter (O.D.) of 1.59 mm. Other electrically-conductive materials, as described herein can also be employed. The capillaries can also be any shape, but are preferably cylindrical.

The fluid injecting tip 209 can be disposed relative to the fluid collecting tip 211 to generate a flowing liquid film region 203 on the one or more internal walls 213, 214 and a gas stream or a gas flow region 202 flowing through the flowing liquid film region 203, when a fluid is injected into the internal cavity 215 via the at least one electrically conductive inlet capillary 201. The fluid injecting tip 209 can be disposed relative to the fluid collecting tip 211 to propagate a plasma discharge along the flowing liquid film region 203 between the at least one electrically-conductive inlet capillary 201 and the at least one electrically-conductive outlet capillary 205. According to various embodiments, the fluid injecting tip 209 can be aligned with the fluid collecting tip 211.

According to particularly preferred embodiments, the internal walls 213, 214 can be defined by the inner walls of the casing 204. As discussed above, the casing 204 can take a variety of geometrical forms. The casing 204 can also be made of a variety of materials, including but not limited to glass materials, plastic materials, and crystalline materials. Some exemplary material include glass, polytetrafluoroethylene, polyethylene terephthalate, and fused quartz. Fused quartz or fused silica is glass consisting of silica in amorphous (non-crystalline) form.

Fused silica is particularly preferred, at least in part, because it provides a wide transparency range, a low electrical conductivity, a high melting point, a high thermal conductivity, and a low thermal expansion coefficient. Generally, the higher the thermal expansion coefficient and the lower the thermal conductivity, the more sensitive the substance is to quick changes in temperature. The extremely low coefficient of thermal expansion of fused quartz, i.e., about 5.5×10$^{-7}$/° C. (20-320° C.), accounts, at least in part, for its remarkable ability to undergo large, rapid temperature changes without cracking.

According to certain embodiments, the casing 204 may be a substantially optically transparent material. Differing degrees of optical transparency are possible. As used herein, "optically transparent" refers to a material or layer that transmits rays of visible light in such a way that the human eye may see through the material distinctly. One definition of optically transparent is a maximum of 50% attenuation at a wavelength of 550 nm (green light) for a material or layer, e.g., a layer 1 μm thick. Another definition can be based on the Strehl Ratio, which ranges from 0 to 1, with 1 being a perfectly transparent material. Exemplary optically transparent materials can have a Strehl Ratio≥0.5, or a Strehl Ratio≥0.6, or a Strehl Ratio≥0.7, or a Strehl Ratio≥0.8, or a Strehl Ratio≥0.9, or a Strehl Ratio≥0.95, or a Strehl Ratio≥0.975, or a Strehl Ratio≥0.99.

The casing 204 may have an electrical conductivity within a range having a lower limit and/or an upper limit. The range can include or exclude the lower limit and/or the upper limit. The lower limit and/or upper limit can be selected from about 10$^{-11}$, about 10$^{-12}$, about 10$^{-13}$, about 10$^{-14}$, about 10$^{-15}$ about 10$^{-16}$, about 10$^{-17}$, about 10$^{-18}$, about 10$^{-19}$, about 10$^{-20}$, about 10$^{-21}$, about 10$^{-22}$, about 10$^{-23}$, about 10$^{-24}$, and about 10$^{-25}$ Siemens/meter. For example, according to certain preferred embodiments, the casing 204 may have an electrical conductivity in a range of from about 10$^{-11}$ to about 10$^{-25}$ Siemens/meter (S/m). Other materials having similar electrical conductivities may also be employed. A casing 204 comprising glass may have an electrical conductivity in a range of from about 10$^{-11}$ to about 10$^{-15}$ S/m. A casing 204 comprising polytetrafluoroethylene may have an electrical conductivity in a range of from about 10$^{-25}$ to about 10$^{-23}$ S/m. A casing 204 comprising polyethylene terephthalate will generally have an electrical conductivity on the order of 10$^{-21}$ S/m.

The casing 204 may have a melting point within a range having a lower limit and/or an upper limit. The range can include or exclude the lower limit and/or the upper limit. The lower limit and/or upper limit can be selected from about 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1025, 1050, 1075, 1100, 1125, 1150, 1175, 1200, 1225, 1250, 1275, 1300, 1325, 1350, 1375, 1400, 1425, 1450, 1475, 1500, 1525, 1550, 1575, and 1600 degrees Celsius. For example, according to certain preferred embodiments, the casing 204 may have a melting point in a range of from about 300° C. to over 1600° C. Other materials having similar melting points may also be employed. A casing comprising polytetrafluoroethylene, for example, may have a melting point of about 327° C. A casing comprising glass may have a melting point of about 1500° C. A casing comprising fused quartz may have a melting point of about 1600° C.

The casing 204 may have a thermal conductivity within a range having a lower limit and/or an upper limit. The range can include or exclude the lower limit and/or the upper limit. The lower limit and/or upper limit can be selected from about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, and 5 W/m-K. For example, according to certain preferred embodiments, the casing 204 may have a thermal conductivity of from about 0.1 to about 5.0 W/m-K. Other materials with similar thermal conductivities may be employed. A casing comprising glass may have a thermal conductivity of from about 0.5 to about 1.0 W/m-K. A casing comprising fused quartz may have a thermal conductivity of about 1.3 W/m-K.

The casing 204 may have a thermal expansion coefficient within a range having a lower limit and/or an upper limit. The range can include or exclude the lower limit and/or the upper limit. The lower limit and/or upper limit can be selected from about 10$^{-7}$, about 10$^{-6}$, and about 10$^{-5}$ per degree Celsius. For example, according to certain preferred embodiments, the casing 204 may have a thermal expansion coefficient of from about 10$^{-7}$ to about 10$^{-5}$ per degree Celsius. Other materials having similar thermal expansion coefficients may be employed. A casing comprising fused quartz may have a thermal expansion coefficient of about 5.5×10$^{-7}$ per degree Celsius. A casing comprising polytetrafluoroethylene may have a thermal expansion coefficient of about 1.35×10$^{-5}$ per degree Celsius.

The casing 204 may include a piece of fused quartz tubing with an I.D. of 3.0 mm (AdValue Technology), which can serve as a viewing port for emission spectroscopy and high speed imaging. According to other particularly preferred embodiments, the electrically-conductive inlet capillary 201 and the electrically-conductive outlet capillary 205 can be incased by fused quartz tubing spacers 206 with an I.D. of 1.6 mm (AdValue Technology); the tubing 206 can be positioned such that the ends of the stainless steel and quartz tube spacers are flush at the entrance and exit of the discharge region, i.e. the internal cavity 215. These inlet and outlet assemblies comprising the electrically-conductive inlet capillary 201 and the electrically-conductive outlet capillary 205 incased by fused quartz tubing spacers 206 can then inserted into either end of the tubing 204.

The fluid injecting tip 209 and the fluid collecting tip 211 (or when employed, the respective ends of the inlet and outlet assemblies) can be positioned such that a gap 216 having a length. The gap 216 can have a length within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.1, 16.2, 16.3, 16.4, 16.5, 16.6, 16.7, 16.8, 16.9, 17, 17.1, 17.2, 17.3, 17.4, 17.5, 17.6, 17.7, 17.8, 17.9, 18, 18.1, 18.2, 18.3, 18.4, 18.5, 18.6, 18.7, 18.8, 18.9, 19, 19.1, 19.2, 19.3, 19.4, 19.5, 19.6, 19.7, 19.8, 19.9, 20, 20.1, 20.2, 20.3, 20.4, 20.5, 20.6, 20.7, 20.8, 20.9, 21, 21.1, 21.2, 21.3, 21.4, 21.5, 21.6, 21.7, 21.8, 21.9, 22, 22.1, 22.2, 22.3, 22.4, 22.5, 22.6, 22.7, 22.8, 22.9, 23, 23.1, 23.2, 23.3, 23.4, 23.5, 23.6, 23.7, 23.8, 23.9, 24, 24.1, 24.2, 24.3, 24.4, 24.5, 24.6, 24.7, 24.8, 24.9, and 25 mm. For example, according to certain preferred embodiments, the gap 216 can have a length of about 4 mm.

The system may also include a power source 116, supplying a voltage across the at least one electrically-conductive inlet capillary and the at least one electrically-conductive outlet capillary. The power source 116 may be adapted to provide a pulsed current, a D.C. current, and/or an A.C.

current between the at least one electrically-conductive inlet capillary 201 and the at least one electrically-conductive outlet capillary 205. As illustrated in FIG. 7, the power source 116 is electrically connected to the at least one electrically-conductive inlet capillary 201, while the at least one electrically-conductive outlet capillary 205 is grounded. The opposite arrangement is also possible, wherein the power source 116 is electrically connected to the at least one electrically-conductive outlet capillary 205, while the at least one electrically-conductive inlet capillary 201 is grounded. A wide variety of other configurations are conceivable, whereby the power source 116 can be adapted to provide a pulsed current, a D.C. current, and/or an A.C. current between the at least one electrically-conductive inlet capillary 201 and the at least one electrically-conductive outlet capillary 205.

A gap 216 separates the at least one electrically-conductive inlet capillary 201 and the at least one electrically-conductive outlet capillary 205. A ratio of the voltage supplied, i.e., the input voltage, by the power source 116 to the length of the gap 216 can be within a range having a lower limit and/or an upper limit. The range can include or exclude the lower limit and/or the upper limit. The input voltage should be sufficient to generate an electric field sufficient to produce the electrical breakdown and discharge plasma formation. The lower limit and/or upper limit can be selected from $2.5\times10^5$ V/m, $3\times10^5$, $4\times10^5$, $5\times10^5$, $6\times10^5$, $7\times10^5$, $8\times10^5$, $9\times10^5$ V/m, $1\times10^6$ V/m, $1.5\times10^6$ V/m, $2\times10^6$ V/m, $2.5\times10^6$ V/m, $3\times10^6$ V/m, $3.5\times10^6$ V/m, $4\times10^6$ V/m, $4.5\times10^6$ V/m, $5\times10^6$ V/m, $5.5\times10^6$ V/m, $6\times10^6$ V/m, $6.5\times10^6$ V/m, $7\times10^6$ V/m, $7.5\times10^6$ V/m, $8\times10^6$ V/m, $8.5\times10^6$ V/m, $9\times10^6$ V/m, $9.5\times10^6$ V/m, and $10\times10^6$ V/m. For example, the gap 216 can have a length, and a ratio of the voltage to the length can be at least about $2.5\times10^5$ V/m or about $5\times10^5$ V/m.

According to certain embodiments, a combination of a gap of from about 1 to about 10 mm and an input voltage ranging from about 8 to about 20 V, can provide peak voltage of from 1 to 5 kV. A peak discharge voltage of about 5 kV in a gap of about 4 mm would provide 12.5 kV/cm as an electric field to create the discharge. Normally in air or pure gas without the liquid water stream, breakdown voltages range between 25 to 35 kV/cm and this can decrease with humidity, but not to the level obtained with a liquid stream contact.

Again, the power source 116 may be adapted to provide a pulsed current, a D.C. current, and/or an A.C. current between the at least one electrically-conductive inlet capillary 201 and the at least one electrically-conductive outlet capillary 205.

The pulsed current may have a frequency within a range having a lower limit and/or an upper limit. The range can include or exclude the lower limit and/or the upper limit. The lower limit and/or upper limit can be selected from about 1, 5, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, and 900 Hz, and 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, and 100 kHz Hz. For example, according to certain preferred embodiments, the pulsed current may have a frequency in a range of from about 1 Hz to about 2000 Hz. A preferred subrange is from about 100 to about 800 Hz. The pulse may have a width of from about 5.0 nanoseconds to about 1.0 ms.

According to various embodiments the voltage supplied by the power source 116 may be brought to a sufficient level to initiate voltage breakdown and to produce a discharge channel (arc or streamer). The discharge channel characteristics such as rate of fire and on-time may be controlled via a peripheral board. The peripheral board may include a timer, which outputs a voltage pulse train based on its own input voltage level and reset characteristics.

The reaction within the reactor may be subject to the discharge channel or arc, which can be optimized/controlled by changing the peripheral board settings. The peripheral board is powered by a 12V power supply only because the timer used on this specific board calls for 4-18V power; any suitable voltage may be utilized. The peripheral board does not supply energy to the reaction it simply controls the on and off of the arc. The voltage pulse train output is sent to a switch built into an ignition coil. The ignition coil may have wires for power and for control of the power switch. The second power supply used in the present setup is merely the power for the arc itself. The peripheral board output may be tied to the switch control of the ignition coil. It should be emphasized, again, that the particular configuration described herein is merely exemplary and that a wide variety of other configurations are readily conceivable, whereby the power source 116 can be adapted to provide a pulsed current, a D.C. current, and/or an A.C. current between the at least one electrically-conductive inlet capillary 201 and the at least one electrically-conductive outlet capillary 205. Based on the particular configuration of the power supply described above, a nominally $2.5\times10^5$ V/m electric field is applied across two conductive electrode surfaces at (2 to 6 mm) distance apart. The voltage is of a high enough potential to overcome the separation causing an electrical discharge or arc. This arcing happens while a fluid (gas and liquid) passes between the contacts. Chemical reactions occur in and near the plasma discharge or arc. The desired product output is partly dependent on the frequency and duration of the arc and the flow, composition, and rate of the input reactants. To better control this reaction the peripheral board is utilized which allows the user to control the characteristics of the pulse train that is sent to the ignition coil's power switch. The number of reactors in a set and the number of sets used for the desired scale needed are all problem specific and can be varied as needed. The specific power supply for the larger unit will depend upon the scale required. A person having ordinary skill in the art will be readily equipped to scale the power supply, the system, and/or method disclosed herein to any desirable level. A person having ordinary skill in the art will readily appreciate that for a given input composition, flow rate, and reactor geometry, a voltage and power sufficient to produce an electrical breakdown in the gap between the electrodes which contains the water and gas mixture may be readily determined.

According to various embodiments, the body portion 217 can be cylindrical. The cylindrical body portion 217 can have a first diameter within a range having a lower limit and/or an upper limit. The range can include or exclude the lower limit and/or the upper limit. The lower limit and/or upper limit can be selected from 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, 0.25, 0.26, 0.27, 0.28, 0.29, 0.3, 0.31, 0.32, 0.33, 0.34, 0.35, 0.36, 0.37, 0.38, 0.39, 0.4, 0.41, 0.42, 0.43, 0.44, 0.45, 0.46, 0.47, 0.48, 0.49, 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.21, 1.22, 1.23, 1.24, 1.25, 1.26, 1.27, 1.28, 1.29, 1.3, 1.31, 1.32, 1.33, 1.34, 1.35, 1.36, 1.37, 1.38, 1.39, 1.4, 1.41, 1.42, 1.43, 1.44, 1.45, 1.46, 1.47, 1.48, 1.49, 1.5, 1.51, 1.52, 1.53, 1.54, 1.55, 1.56, 1.57, 1.58, 1.59, 1.6, 1.61, 1.62, 1.63, 1.64, 1.65, 1.66, 1.67, 1.68, 1.69, 1.7, 1.71, 1.72, 1.73, 1.74, 1.75, 1.76, 1.77, 1.78, 1.79, 1.8, 1.81, 1.82, 1.83, 1.84, 1.85, 1.86, 1.87, 1.88, 1.89, 1.9, 1.91, 1.92, 1.93, 1.94, 1.95, 1.96, 1.97, 1.98, 1.99, and 2 cm. For example, according to certain preferred embodiments, the cylindrical body portion 217 can have a first diameter 0.1 to 1 cm. The at least one electrically-conductive inlet capillary can have a second diameter that is less than the first diameter. The at least one electrically-conductive outlet capillary can have a third diameter that is greater than the second diameter and less than the first diameter.

Figure 9:
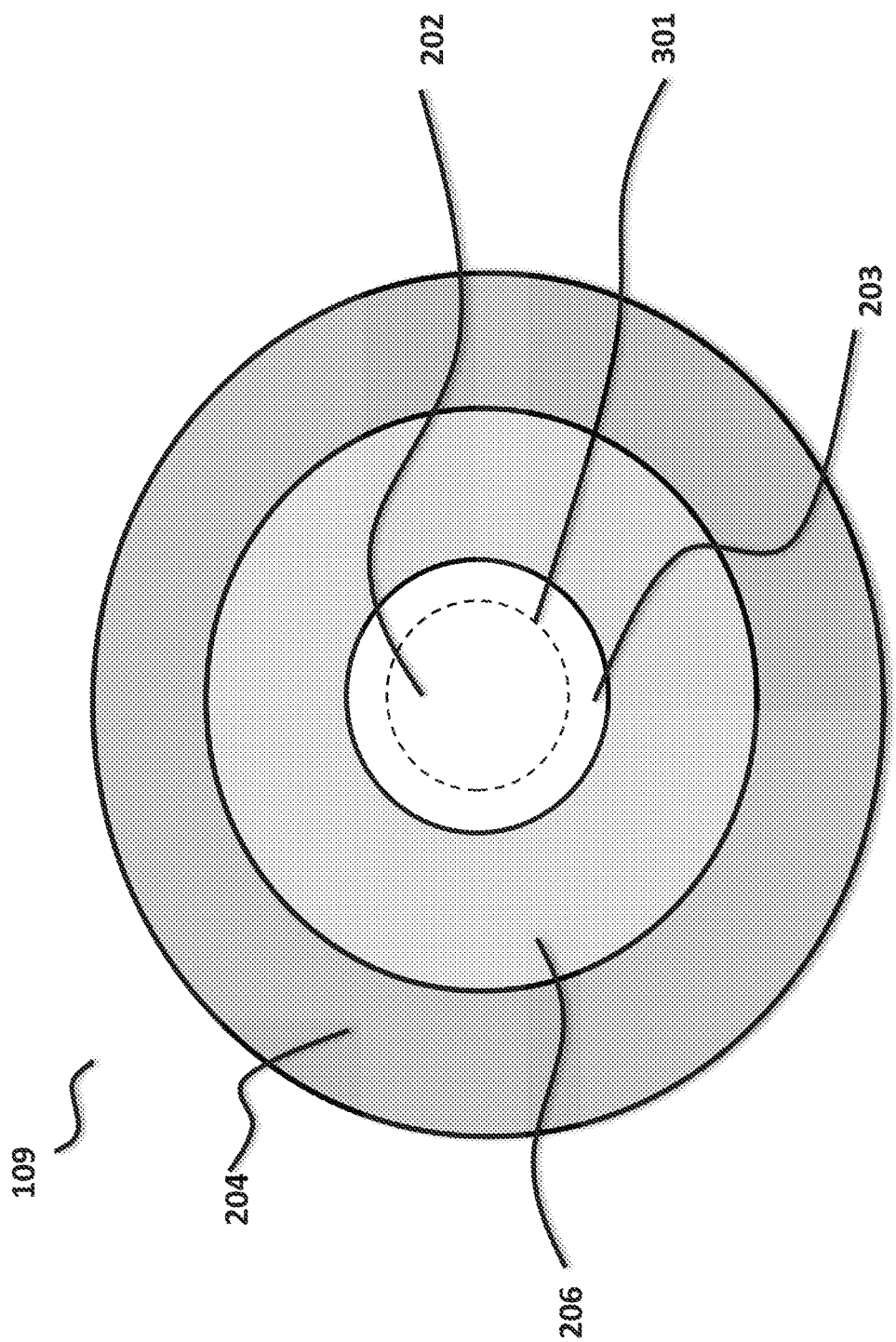
FIG. 9 is a schematic radial cross section of a plasma reactor.

FIG. 9 shows an illustration of a radial cross section along line A-A as shown in FIG. 7 of the plasma reactor 109, i.e. the discharge region, according to various embodiments. The gas flow region 202 can be bounded by a highly turbulent gas/liquid interface 301, separating the gas flow and plasma discharge region 202 from the liquid film flow region 203. As discussed under FIG. 7, the liquid film flow region 203 flows along the casing 204, which may act as the reactor wall.

According to various embodiments, the gas flow can be determined by the nozzle, i.e. the outlet of a capillary, diameter and the pressure. The liquid flow can be determined by the gas flow, and all other dependent properties can thereafter be determined. The maximum liquid flow can be determined by the gas flow, and all other dependent properties can thereafter be determined. The pressure of the inlet gas can be in the range of 10 to 500 pounds per square inch (psi). For an inlet gas pressure of 60 psi and a 0.01 inch inlet capillary nozzle with a 3 mm tube, the gas flow is 0.3 liters per minute and the upper liquid flow can be 4 ml/min. In addition to scaling up this process by placing many single reactors in parallel, alternative geometries could be used which utilize a single large volume chamber for the flow of water and gas in conjunction with multiple inlet and outlet nozzles into and out of the single chamber.

Figure 10:
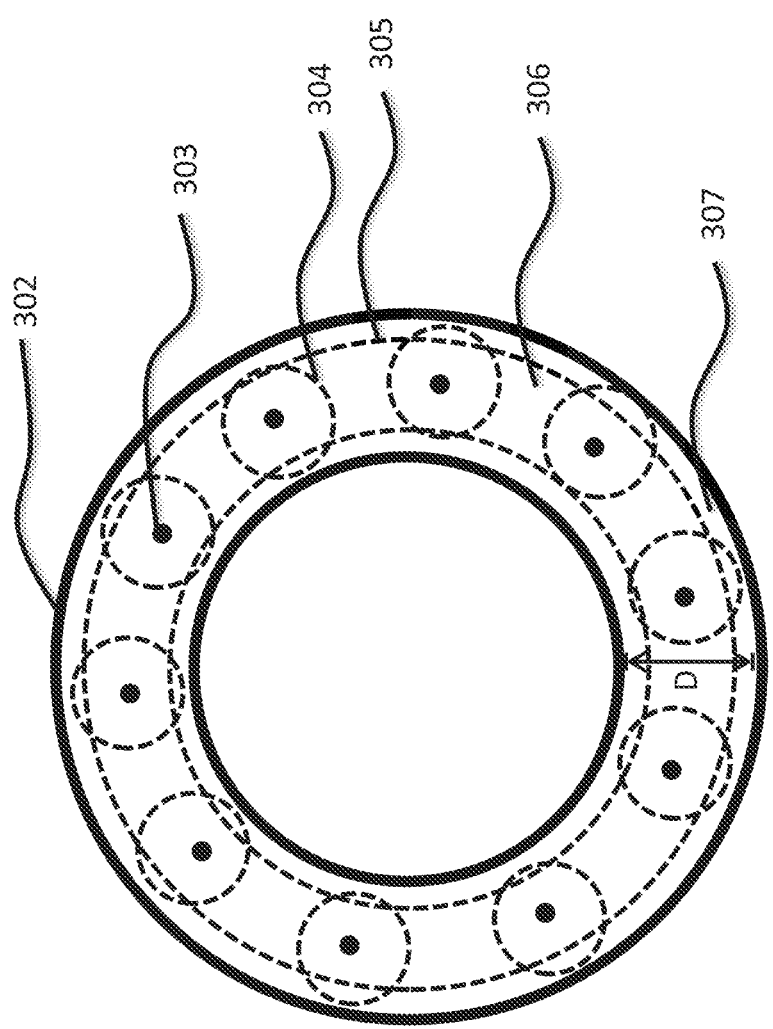
FIG. 10 is a schematic cross section of a multiple reactor embodiment of the invention.

FIG. 10 shows an illustration of a radial cross section of an exemplary configuration comprising a reactor body 302 and a plurality of electrically-conductive inlet capillaries 303. The reactor body 302 is an annular ring and has a distance D between its walls. Each of the electrically-conductive inlet capillaries 303 can have a range of influence 304 within the reactor body 302. Inside its range of influence each electrically-conductive inlet capillary can be used to form a plasma discharge. One or more electrically-conductive outlet capillaries (not shown) can be aligned with or otherwise positioned relative to the plurality of electrically-conductive inlet capillaries 303 to generate a flowing liquid film region on one or more internal walls of the reactor body 302 and a gas stream or a gas flow region flowing through the flowing liquid film region, when a fluid is injected into the internal cavity via the at least one electrically conductive inlet capillary 303. The one or more electrically-conductive outlet capillaries (not shown) can additionally or alternatively be aligned with or otherwise positioned relative to the plurality of electrically-conductive inlet capillaries 303 to propagate a plasma discharge along the flowing liquid film region between one or more of the plurality of electrically-conductive inlet capillaries 303 and one or more of the one or more plurality of electrically-conductive outlet capillaries. As shown, a gas liquid interface 305 can be generated between a liquid film region 307 and a gas flow region 306 passing through the liquid film region 307.

Figure 11:
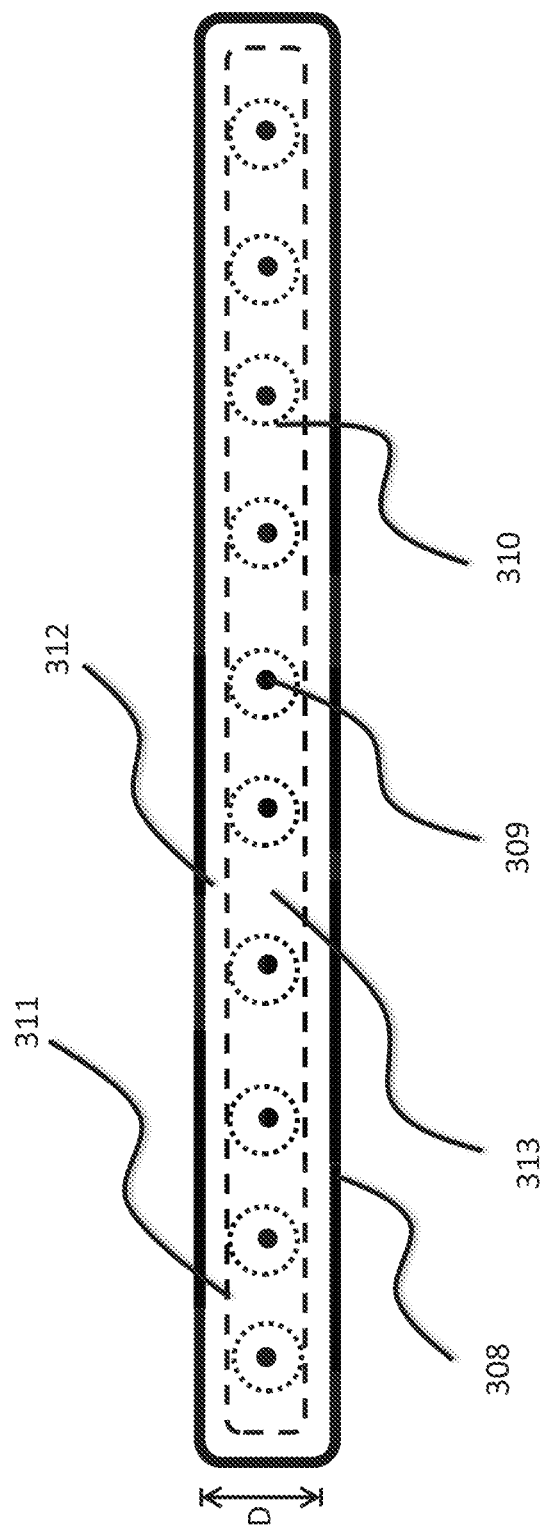
FIG. 11 is a schematic cross section of an alternative multiple reactor embodiment.

FIG. 11 shows an illustration of a radial cross section of an exemplary configuration comprising a reactor body 308 and a plurality of electrically-conductive inlet capillaries 309. The reactor body 308 is an elongated box and has a distance D between its walls. Each of the electrically-conductive inlet capillaries 309 can have a range of influence 310 within the reactor body 308. Inside its range of influence each electrically-conductive inlet capillary can be used to form a plasma discharge. One or more electrically-conductive outlet capillaries (not shown) can be aligned with or otherwise positioned relative to the plurality of electrically-conductive inlet capillaries 309 to generate a flowing liquid film region on one or more internal walls of the reactor body 308 and a gas stream or a gas flow region flowing through the flowing liquid film region, when a fluid is injected into the internal cavity via the at least one electrically conductive inlet capillary 309. The one or more electrically-conductive outlet capillaries (not shown) can additionally or alternatively be aligned with or otherwise positioned relative to the plurality of electrically-conductive inlet capillaries 309 to propagate a plasma discharge along the flowing liquid film region between one or more of the plurality of electrically-conductive inlet capillaries 309 and one or more of the one or more plurality of electrically-conductive outlet capillaries. As shown, a gas liquid interface 311 can be generated between a liquid film region 312 and a gas flow region 313 passing through the liquid film region 312.

Any configuration of the reactor body can be employed. The configurations shown in the figures are merely exemplary. A variety of geometries can be employed, but a cylindrical geometry tends to maximize contact between the discharge plasma channel and the liquid, which is desirable.

Figure 12:
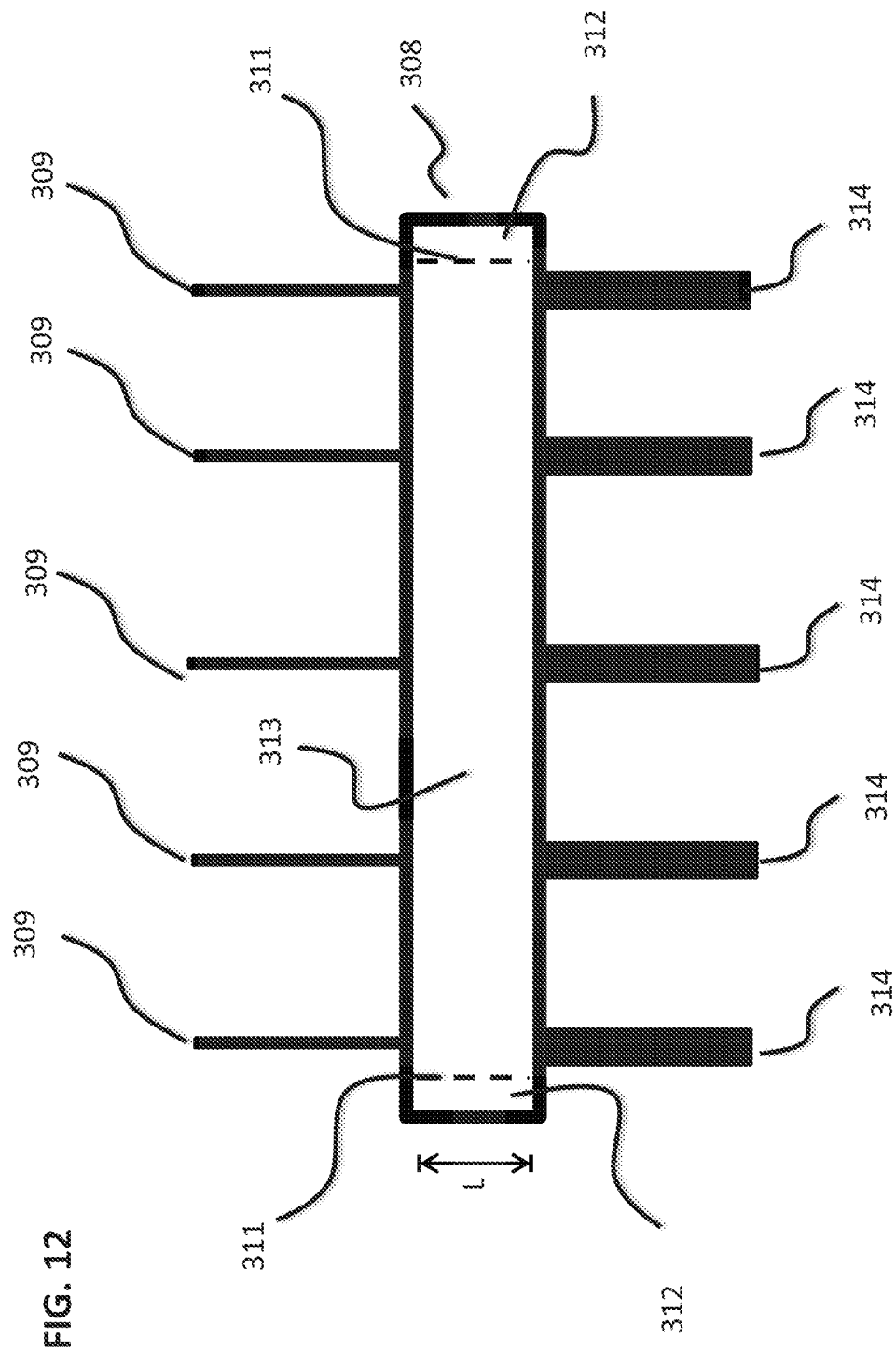
FIG. 12 is a schematic depiction of a manifold for a multiple reactor embodiment of the invention.

FIG. 12 shows a vertical cross-section of a reactor body 308 as depicted in either FIG. 10 or FIG. 11. Since the cross section would be the same for both the reactor body could have been designated with reference numeral 302. Reference numerals in the specific embodiment shown in FIG. 12 correspond to those in FIG. 11. Again, since the cross section would be the same for FIG. 10, the reference numerals of FIG. 10 could have been used. FIG. 12 also shows a plurality of electrically-conductive outlet capillaries 314. The electrically-conductive outlet capillaries 314 are shown in alignment with the electrically-conductive inlet capillaries 309. FIG. 12 also illustrates a length L of the reactor body 308.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

I claim:

1. A method for producing nitrates, nitrites, and hydrogen peroxide plasma activated water, comprising the steps of:
providing a continuously flowing plasma reactor;
injecting a mixture comprising liquid water and a nitrogen-containing gas into at least one electrically-conductive inlet capillary tube of the continuously-flowing plasma reactor to generate a flowing liquid film region on one or more internal walls of the continuously-flowing plasma reactor with a gas stream flowing through the flowing liquid film region;
propagating a plasma discharge along the flowing liquid film region from the at least one electrically-conductive inlet capillary tube to at least one electrically-conductive outlet capillary tube at an opposing end of the continuously-flowing plasma reactor;
dissociating the liquid water in the plasma discharge to form a plurality of dissociation products;
producing hydrogen peroxide and nitrogen oxides from the plurality of dissociation products and the nitrogen-containing gas;
dissolving the hydrogen peroxide and the nitrogen oxides into the flowing liquid film region; and
directing the plasma activated water containing the hydrogen peroxide and the nitrogen oxides to a membrane reactor-concentrator comprising a plasma activated water flow channel with a plasma activated water inlet and a plasma activated water outlet, a dry gas inlet and a humidified gas outlet, the plasma activated water flow channel comprising an ion selective membrane, the membrane reactor-concentrator further comprising a recycle conduit and a recycle control valve for recycling gas and water vapor from the humidified gas outlet of the membrane reactor-concentrator to a nitrogen-containing gas inlet of the plasma reactor, whereby the plasma activated water will contact the ion selective membrane, water will pass through the membrane into the dry gas to create a humidified gas, and the plasma activated water in the plasma activated water flow channel will have increased concentrations of nitrates, nitrites and hydrogen peroxide; and,
operating the recycle control valve to control the flow of recycling gas and water vapor through the recycle conduit to the nitrogen-containing gas inlet of the plasma reactor.

2. The method of claim 1, further comprising the step of recycling the humidified gas from the humidified gas outlet of the membrane concentrator to the plasma reactor.

3. The method of claim 1, wherein the electrically-conductive inlet capillary comprises a first internal diameter, the tubular reactor body comprises a second internal diameter, and the electrically conductive outlet capillary comprises a third internal diameter, the third internal diameter being larger than the first internal diameter and smaller than the second internal diameter.

4. The method of claim 1, wherein the ion selective membrane comprises a sulfonated tetrafluoroethylene based fluoropolymer-copolymer.

5. The method of claim 1, wherein the ion selective membrane comprises polymeric membranes.

6. The method of claim 5, wherein the polymeric membranes comprise at least one selected from the group consisting of polyamides, polyurethanes, poly (bio-amides), polyanilines, polyesters, polyimides, cellulose, and sulfonated polyethersulfone.

7. The method of claim 1, wherein the ion selective membrane comprises a nanofiltration membrane for nitrate removal.

8. The method of claim 1, wherein the ion selective membrane comprises a reverse osmosis membrane.

9. The method of claim 1, wherein the ion selective membrane comprises a ceramic membrane.

10. The method of claim 9, wherein the ceramic membrane comprises at least one selected from the group consisting of $SiO_2$, $TiO_2$, $ZrO_2$, and $\gamma$-$Al_2O_3$.

11. The method of claim 1, wherein the ion selective membrane comprises at least one selected from the group consisting of graphene, graphene oxide, carbon-based graphene oxide carbon nanotubes dispersed in a polymer matrix.

12. The method of claim 1, wherein the ion selective membrane has a pore size of from 1-2 nanometers.

13. The method of claim 1, wherein the ion selective membrane has a pore size and structure which retains $H_2O_2$ and passes water.

* * * * *